(12) United States Patent
Kelly et al.

(10) Patent No.: US 9,290,080 B1
(45) Date of Patent: Mar. 22, 2016

(54) TWO-WAY HINGELESS VENTILATOR

(75) Inventors: Timothy A. Kelly, Salem, VA (US); Dwight Smith, Bedford, VA (US); Whitwell C. Kelly, Salem, VA (US)

(73) Assignee: Salem Vent International, Inc., Salem, VA (US)

( * ) Notice: Subject to any disclaimer, the term of this patent is extended or adjusted under 35 U.S.C. 154(b) by 639 days.

(21) Appl. No.: 13/616,382

(22) Filed: Sep. 14, 2012

Related U.S. Application Data

(60) Provisional application No. 61/592,270, filed on Jan. 30, 2012.

(51) Int. Cl.
*B60H 1/26* (2006.01)

(52) U.S. Cl.
CPC .................... *B60H 1/262* (2013.01)

(58) Field of Classification Search
CPC .................. B60H 1/26; B60H 1/262
See application file for complete search history.

(56) References Cited

U.S. PATENT DOCUMENTS

| | | | | |
|---|---|---|---|---|
| 3,046,865 A * | 7/1962 | Kelly | ................ | 454/145 |
| 3,102,464 A * | 9/1963 | Kelly et al. | ................ | 454/145 |
| 3,375,772 A * | 4/1968 | Kelly et al. | ................ | 454/143 |
| 3,456,571 A * | 7/1969 | Kelly et al. | ................ | 454/145 |
| 3,672,291 A * | 6/1972 | Kujawa, Jr. | ......... | B60H 1/3407 454/145 |
| 3,760,707 A * | 9/1973 | Kelly | ................ | 454/145 |
| 3,763,760 A * | 10/1973 | Erickson | ................ | 454/145 |
| 3,839,950 A * | 10/1974 | Kelly et al. | ................ | 454/145 |
| 4,038,911 A * | 8/1977 | Hart | ................ | 454/94 |
| 4,403,805 A * | 9/1983 | Strem et al. | ................ | 296/221 |
| 4,452,129 A * | 6/1984 | Kelley et al. | ................ | 454/145 |
| 4,519,645 A * | 5/1985 | Kelly et al. | ................ | 296/224 |
| 4,522,115 A * | 6/1985 | Kelly et al. | ................ | 454/94 |
| 4,938,122 A * | 7/1990 | Ziemba | ................ | 454/145 |
| 5,766,068 A * | 6/1998 | Kelly | ................ | 454/145 |
| 5,797,791 A * | 8/1998 | Humphrey et al. | ................ | 454/134 |
| 6,106,385 A * | 8/2000 | Humphrey et al. | ................ | 454/134 |
| 6,126,538 A * | 10/2000 | Kelly et al. | ................ | 454/143 |
| 6,280,315 B1 * | 8/2001 | Kelly | ................ | 454/145 |
| 6,514,135 B1 * | 2/2003 | Kelly | ................ | 454/136 |
| 6,558,246 B2 * | 5/2003 | Kelly et al. | ................ | 454/145 |
| 6,602,126 B1 * | 8/2003 | Teskey | ................ | 454/145 |
| 6,932,694 B2 * | 8/2005 | Jeffries | ................ | 454/145 |
| 8,727,841 B2 * | 5/2014 | Lugas et al. | ................ | 454/145 |

OTHER PUBLICATIONS

SalemVent, Presentation to potential customer, Mar. 7, 2008.*
Power Point Presentation, Dual V-Ventilator, Mar. 7, 2008.

* cited by examiner

*Primary Examiner* — Steven B McAllister
*Assistant Examiner* — Jonathan Cotov
(74) *Attorney, Agent, or Firm* — Thomas, Karceski & Karmilovich, P.C.

(57) ABSTRACT

A hingeless ventilator comprises a frame defining two openings surrounded by a seating rim, which is surrounded by a door recess. A pair of upright sleeves is disposed between the openings, and each upright sleeve defines an exterior track surface. A door is disposed to face the outer surface of the frame and has a main body configured to be selectively positionable to cover and uncover both of the openings and defines a lip surrounding the periphery thereof and extending generally perpendicularly to the main body. Two door struts connected to the door extend through the frame openings and hold a handle that has rollers that are biased against the exterior track surfaces of the sleeves.

6 Claims, 14 Drawing Sheets

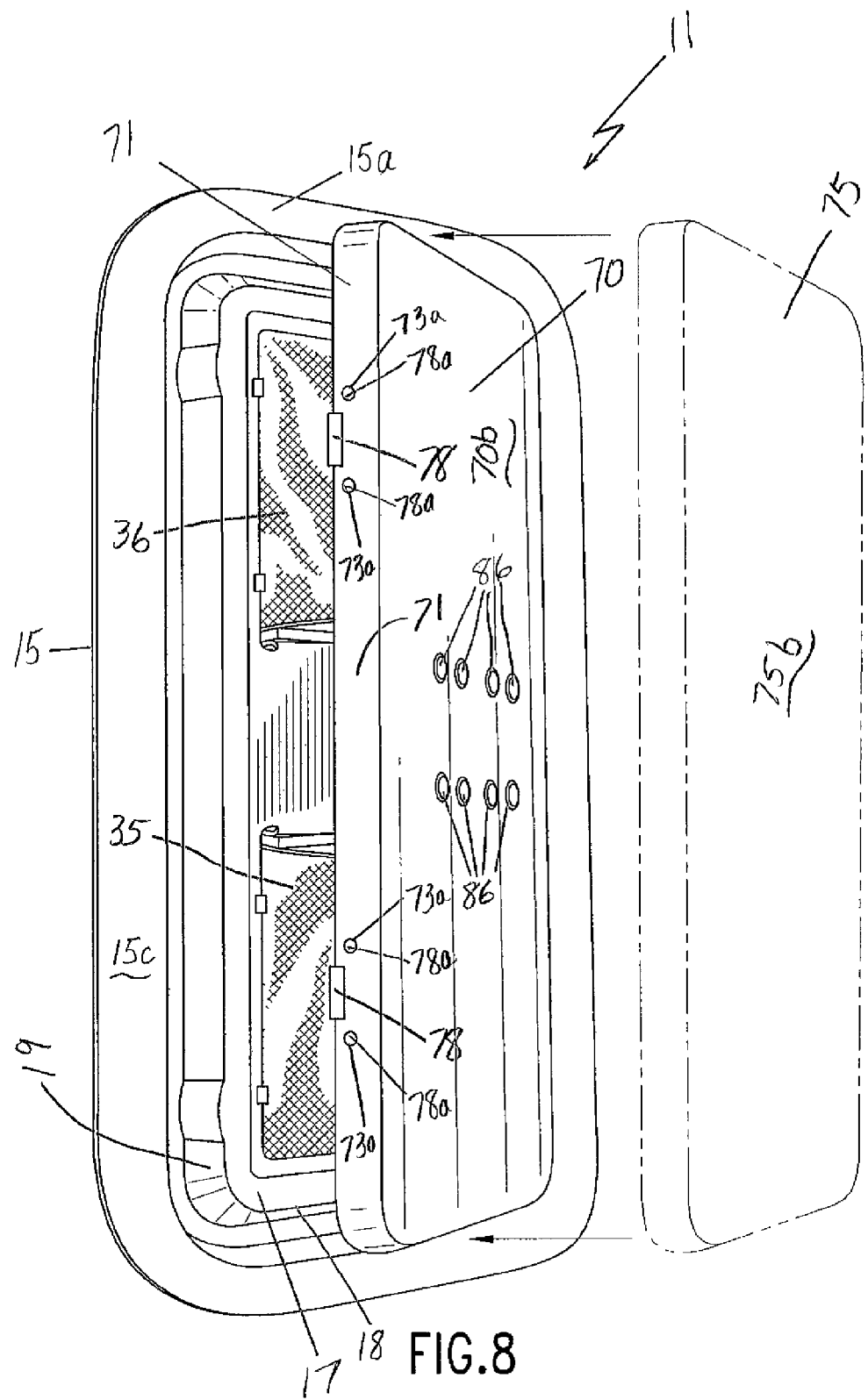

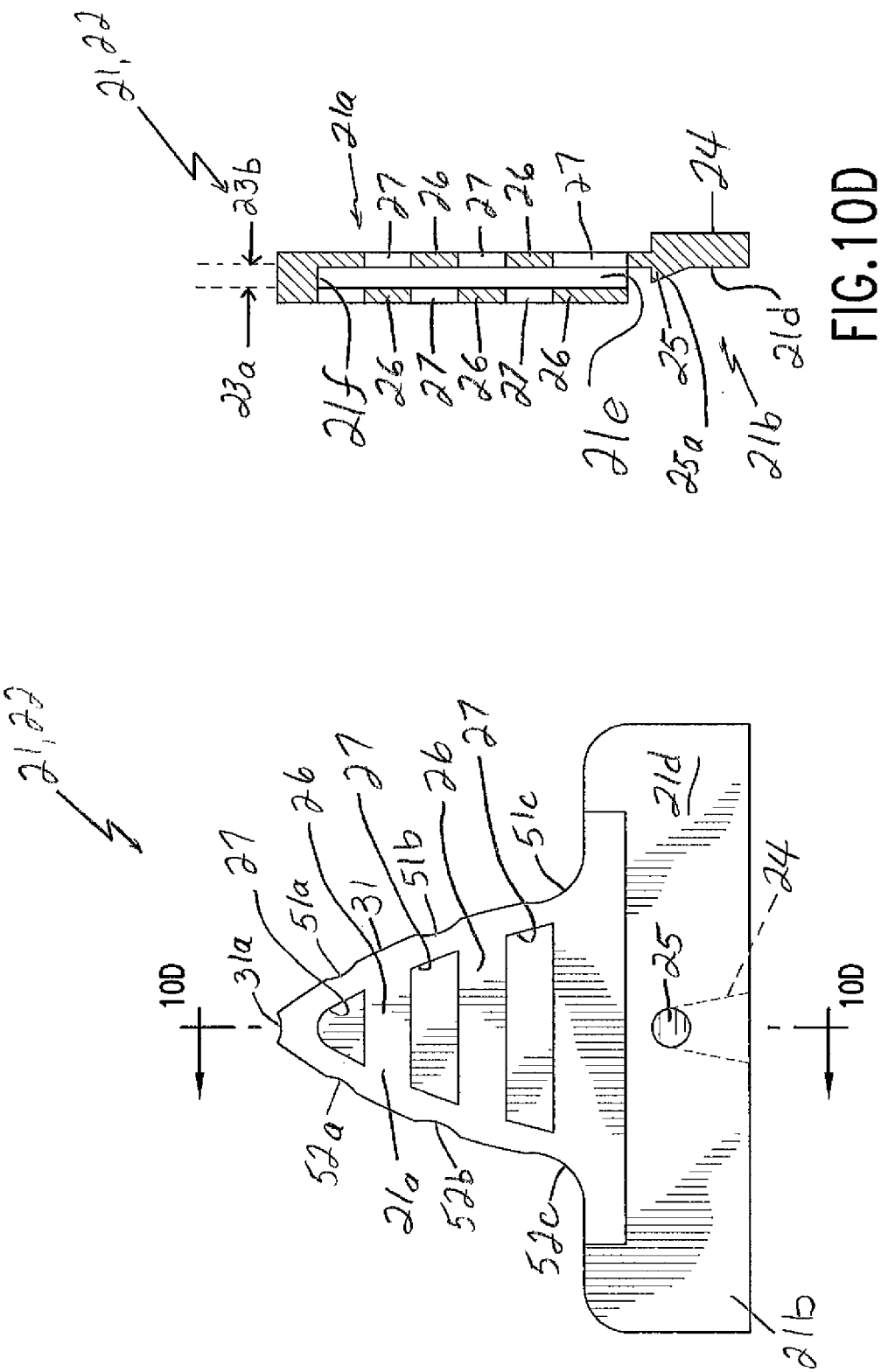

TWO-WAY HINGELESS VENTILATOR

CROSS-REFERENCE TO RELATED APPLICATIONS

The present application claims priority to currently U.S. Provisional Patent Application Ser. No. 61/592,270, filed Jan. 30, 2012, which is hereby incorporated herein by this reference for all purposes.

STATEMENT REGARDING FEDERALLY SPONSORED RESEARCH OR DEVELOPMENT

Not applicable.

FIELD OF THE INVENTION

The present disclosure relates to hingeless ventilators and in particular to two-way hingeless ventilators.

BACKGROUND OF THE INVENTION

Two-way hingeless ventilators are known and in common use in the sleeping compartments of long-haul truck cabs for example. Many such ventilators are rectangular in shape. If one considers the ventilator's longer dimension to define the ventilator's roll axis and the ventilator's shorter dimension that is perpendicular to the ventilator's longer dimension to define the ventilator's pitch axis, then the third dimension defining the ventilator's thickness would define the so-called yaw axis that is perpendicular to both the roll axis and the pitch axis. Ideally, the user should pull on the ventilator's handle so as to have the handle rotate about the ventilator's roll axis. Repeated opening and closing of such ventilators can cause wear such that rough handling during movement of the handle can cause the door of the ventilator to become misaligned and/or dislodged from proper seating on the surfaces that surround the opening and face the door. Moreover, if the user pulls on the ventilator's handle so as to impart rotation about the ventilator's roll axis and/or the ventilator's yaw axis, the effort required to move the door into different positions can be significant and result in over rotation of the handle past the desired positioning of the angle of the door with respect to the exterior of the truck cab. Attempts to compensate for such less than ideal operation of the ventilator over prolonged periods have involved use of additional components such as brackets, spanner washers, nuts, etc., which undesirably add additional cost and complexity, both to the ventilator itself and to the process of making the ventilator.

BRIEF DESCRIPTION OF THE INVENTION

Aspects and advantages of the present disclosure are set forth below in the following description, or may be obvious from the description, or may be learned through practice of the invention.

To achieve the objects and in accordance with the purpose of the invention, as embodied and broadly described herein, an embodiment of a two-way hingeless ventilator comprises a generally planar-shaped frame extending generally in a first plane and having opposite inner and outer surfaces parallel to one another. The frame can further define a pair of spaced apart openings. As described more fully below, the ventilator includes a door that is configured to cover and close off the openings when the door is disposed in the closed position. The ventilator also includes a handle that the operator manipulates to move the door between the closed position and any of the various open positions. Typically, the ventilator will be installed so that the door faces the outside environment and the handle is disposed in the environment that is sheltered from the elements like weather in the outside environment.

The door of the ventilator includes a main body that has a generally planar inner surface that is disposed to face the outer surface of the frame. The door is configured to be positioned selectively at the desire of the operator to cover and uncover both of the openings in the frame. A pair of side-by side door struts can be connected to the main body of the door and desirably to the inner surface of the door. Each of the door struts desirably extends in a direction generally perpendicular to the plane of the inner surface of the door and is disposed so as to extend from the inner surface of the door and through one of the openings in the frame. Each of the door struts defines therein a Y-shaped cutout defined in at least one door strut extending through one of the openings in the frame. At least one of the upright sleeves desirably defines a guide stop that extends through the Y-shaped cutout that is defined in at least the one door strut extending through the one of the openings in the frame. Each of the door struts desirably defines therein a first elongated cutout that elongates desirably in a direction that is perpendicular to the plane of the inner surface of the door.

The hingeless ventilator includes a handle that is connected between the two door struts and defining an upper body and a lower body. The handle's upper body is desirably configured with a gripping surface for the hand of an operator to facilitate manipulation and movement of the handle by the operator. The lower body of the handle defines a hollow inner chamber that is disposed between the two opposite sides of the handle. Each side of the handle defines an elongated slot that communicates with the inner chamber and has a first upper end and a first lower end that is disposed opposite the first upper end. An elongated axle is disposed so as to extend through the hollow inner chamber of the handle. Each opposite end of the axle is configured so as to be slideably held in the one of the elongated cutouts of one of the door struts. The axle is biased toward the first lower ends of the slots that are defined through the sides of the lower body of the handle. This can be accomplished by one or more springs disposed in the inner chamber of the handle.

In one embodiment the ventilator can include a pair of upright sleeves, one upright sleeve disposed between one of the two openings in the frame, and the other upright sleeve disposed between the other of the two openings in the frame. Each of the upright sleeves desirably is connected to the inner surface of the frame by one of a respective pair of uprights. The uprights and upright sleeves and can extend in a direction that is generally perpendicular to the inner surface of the frame. Each of the upright sleeves desirably can be disposed and configured to be mounted snugly over a respective one of the uprights.

Each of the upright sleeves desirably can define a path having an exterior track surface that includes a forward edge and a rearward edge disposed opposite the forward edge. Each of the exterior track surfaces includes an apex surface at the highest point in the path and disposed between the forward edge and the rearward edge. The forward edge and the rearward edge desirably define a shape that tapers towards the apex surface of the upright sleeve. Each of the forward edge and the rearward edge of the exterior track surface desirably defines a plurality of indents.

A roller is rotatably mounted on each end of the axle and is biased by the same force that biases the axle in the handle so that the rollers are kept contacting the exterior track surfaces of the upright sleeves in the frame. Thus, the rollers provide a rolling engagement between the handle that is attached to the door and the upright sleeves that are attached to the frame. Relative movement between the handle and the frame effects correspondingly different positions of the door relative to the two openings in the frame. The shape of the rollers desirably conforms to the shapes of the indents in the exterior track surfaces of the upright sleeves of the frame.

The door desirably defines a lip that surrounds the periphery of the main body of the door and extends in a direction that generally is perpendicular to the generally planar inner surface of the main body of the door and thus can be thought of as forming a skirt around the edge of the main body of the door. A resiliently deformable gasket desirably can be disposed on and cover most of the inner surface of the door and extend so as to butt against the inner surface of the lip that surrounds the main body of the door and provides a seal against the sealing rim of the frame as well as serving a sound-deadening function by preventing surfaces of the door from touching surfaces of the frame and thereby generating wear, damage and annoying noises.

The frame desirably defines a seating rim that surrounds the openings and that defines a plurality of dimples. Each dimple is formed desirably as a raised portion that is symmetrically disposed as part of the outwardly facing wall that in part defines the seating rim of the outer surface of the frame. The dimples of the seating rim desirably will be disposed on each of the longer lengths that define the seating rim parallel to the pivoting axis of the door of the ventilator. The outer surface of the frame also desirably defines a door recess that is configured to surround the seating rim to provide space for the lip of the door to pivot within during movements of the door to various positions of relatively uncovering the openings of the frame.

At least one door glide desirably can be connected to a portion of the lip of the door and disposed in registry with at least one of the dimples of the seating rim. Moreover, the door glides desirably will be disposed on the two longer lengths that define the lip of the door and in registry with the dimples of the seating rim. Desirably, a separate door glide is provided on the lip of the door in registry with each one of the dimples of the seating rim. Each door glide slides against one of the dimples of the seating rime when the door pivots relative to the frame during movements of the door to various positions of relatively uncovering the openings of the frame. In this way, the door glides also prevent surfaces of the door from touching surfaces of the frame forming the dimples and thereby generating annoying noises and wear that adversely affects the fit of the door to the frame.

The pair of spaced apart openings in the frame desirably can be configured to receive a pair of screens or other suitable anti-bug devices. In some embodiments, the screens or other suitable anti-bug devices can be configured so as to be selectively removable by the user, while in other embodiments they are configured so as not to be selectively removable by the user.

A decorative shell can be connected to the outer surface of the door and desirably can be painted or otherwise textured in order to present an aesthetically pleasing appearance to the viewer.

Those of ordinary skill in the art will better appreciate the features and aspects of such embodiments, and others, upon review of the specification. The accompanying drawings, which are incorporated in and constitute a part of this specification, illustrate at least one presently preferred embodiment of the invention as well as some alternative embodiments. These drawings, together with the description, serve to explain the principles of the invention but by no means are intended to be exhaustive of all of the possible manifestations of the invention.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 8 is an elevated perspective view from the outwardly facing side of an embodiment of the ventilator of the present disclosure schematically indicating assembly of a decorative cover onto the door with the door in the completely open position.

FIG. 10C is a plan view from one side of the embodiment of FIGS. 10A and 10B.

FIG. 10D is a cross-sectional view taken along the lines 10D-10D in the view shown in FIG. 10C.

DETAILED DESCRIPTION OF EMBODIMENTS OF THE INVENTION

Figure 1:
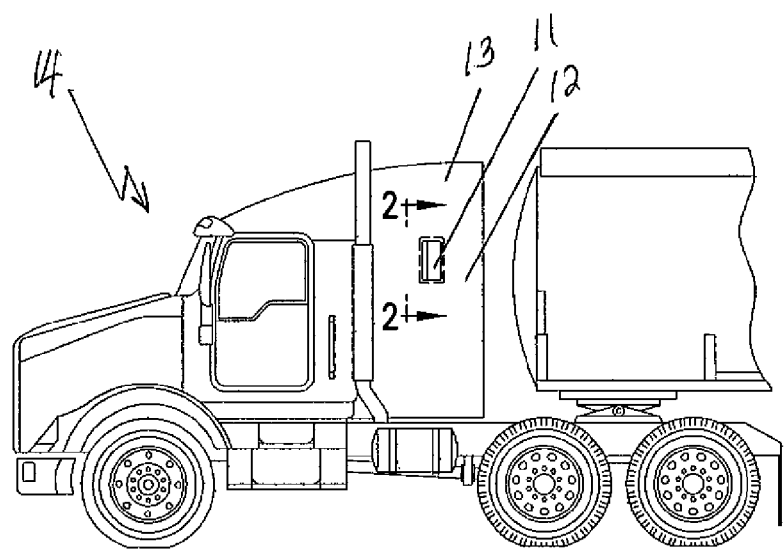
FIG. 1 is an elevated perspective view of the sleeper cab of a truck containing an embodiment of the ventilator of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of embodiments of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

Figure 4:
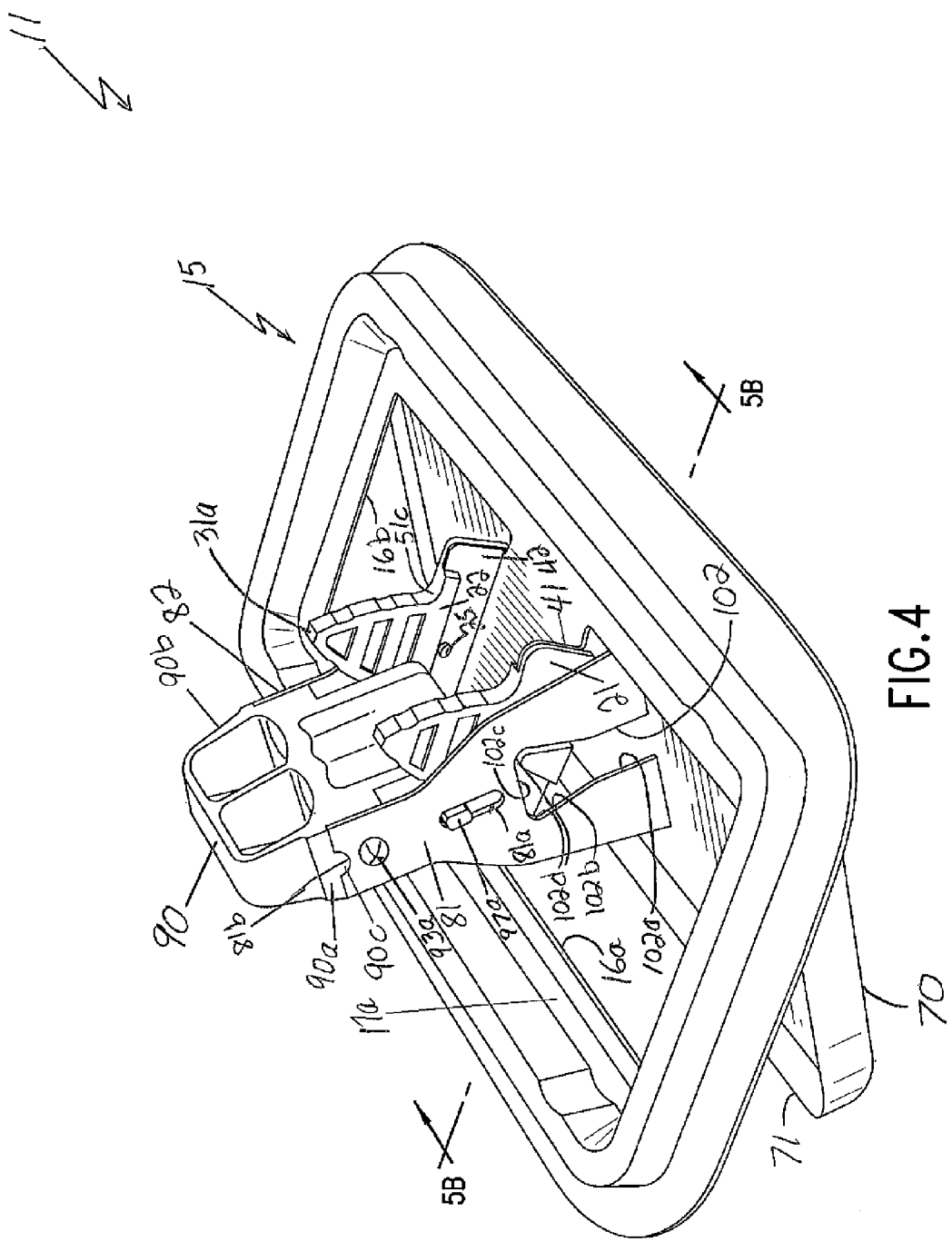
FIG. 4 is an elevated perspective view from the operator's side of an embodiment of the ventilator of the present disclosure with the door completely open in one of the two directions and without any screens in order to facilitate viewing of other components.

A presently preferred embodiment of an assembled two-way hingeless ventilator in accordance with the present disclosure is shown in FIG. 4 and is represented generally by the numeral 11. As shown in FIG. 1, ventilator 11 desirably can be installed in the wall 12 of a sleeper cab 13 of a tractor 14 used to tow a trailer. Embodiments of a two-way hingeless ventilator 11 in accordance with the present disclosure also can be used in other environments. As shown in FIG. 4 for example, the hingeless ventilator 11 has two main components, a frame 15 and a door 70. Desirably, the hingeless ventilator 11 has a third component in the form of a handle 90 that the user manipulates to move the door 70 with respect to the frame 15. The frame 15 is configured to be attached to the wall 12 that defines the opening in which the ventilator 11 is to be installed. The typical installation of the ventilator 11 will have the door 70 facing the outside environment exposed to the elements like weather and bugs. The door 70 is selectively moveable by the user's manipulation of the handle 90 to open and close the ventilator 11 depending on whether air transfer is desired between the interior of the cab 13 and the outdoor environment.

Figure 2:
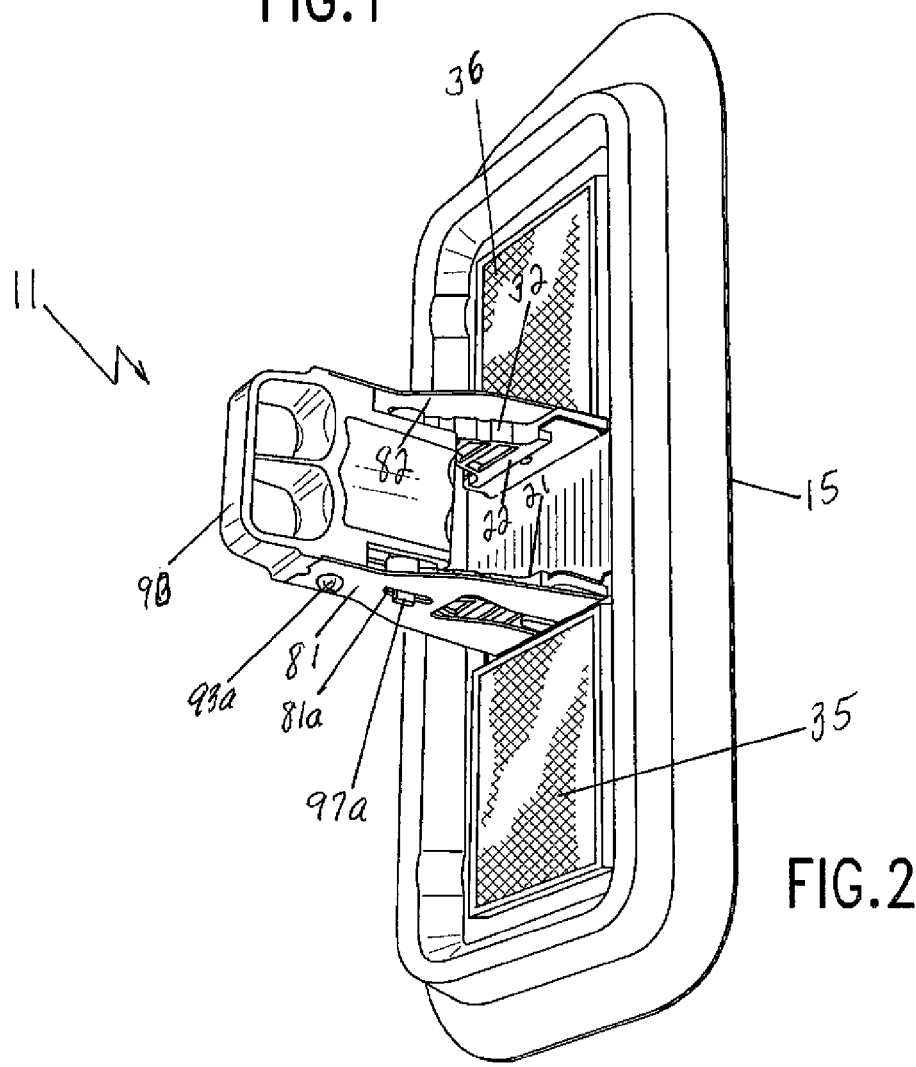
FIG. 2 is an elevated perspective view of the operator's side (i.e., inside facing side) of an embodiment of the ventilator of the present disclosure taken from the perspective indicated in FIG. 1 by the arrows designated 2-2.
Figure 3:
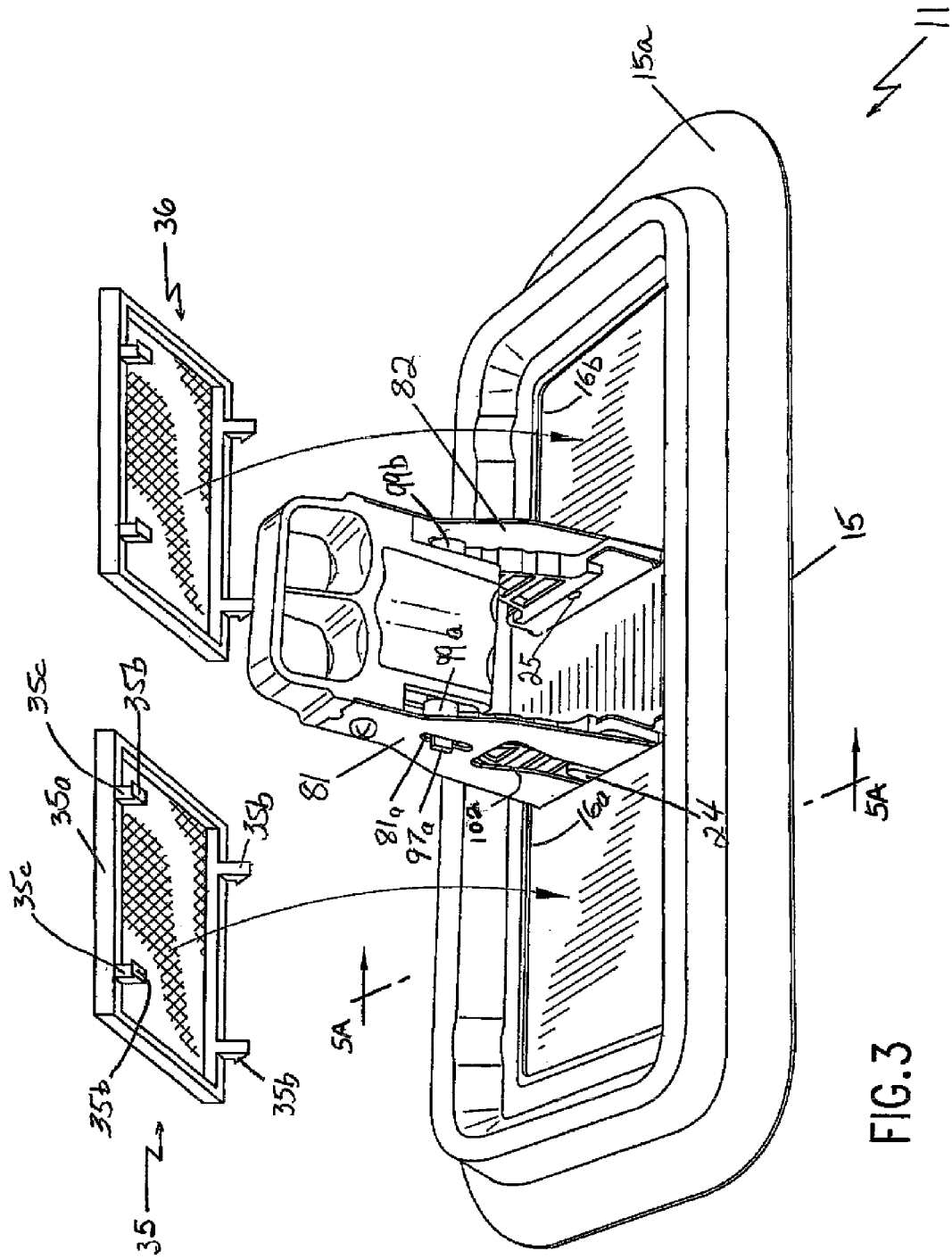
FIG. 3 is an elevated perspective view from the operator's side of an embodiment of the ventilator of the present disclosure schematically indicating selective placement of a screen into each of the two openings in the frame with the door in the completely closed position.
Figure 5A:
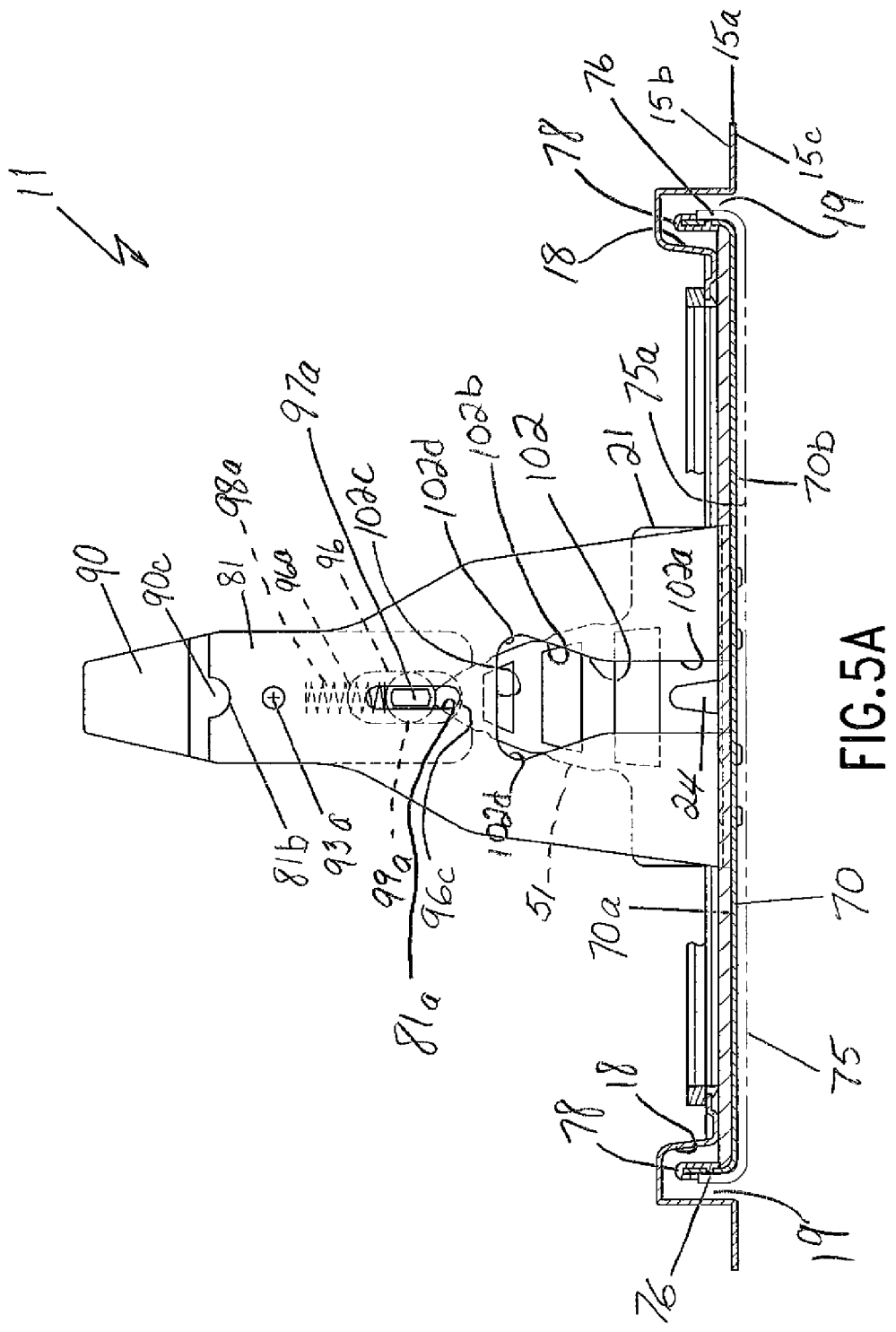
FIG. 5A is a cross-sectional view taken along the lines 5A-5A in the view shown in FIG. 3.
Figure 9A:
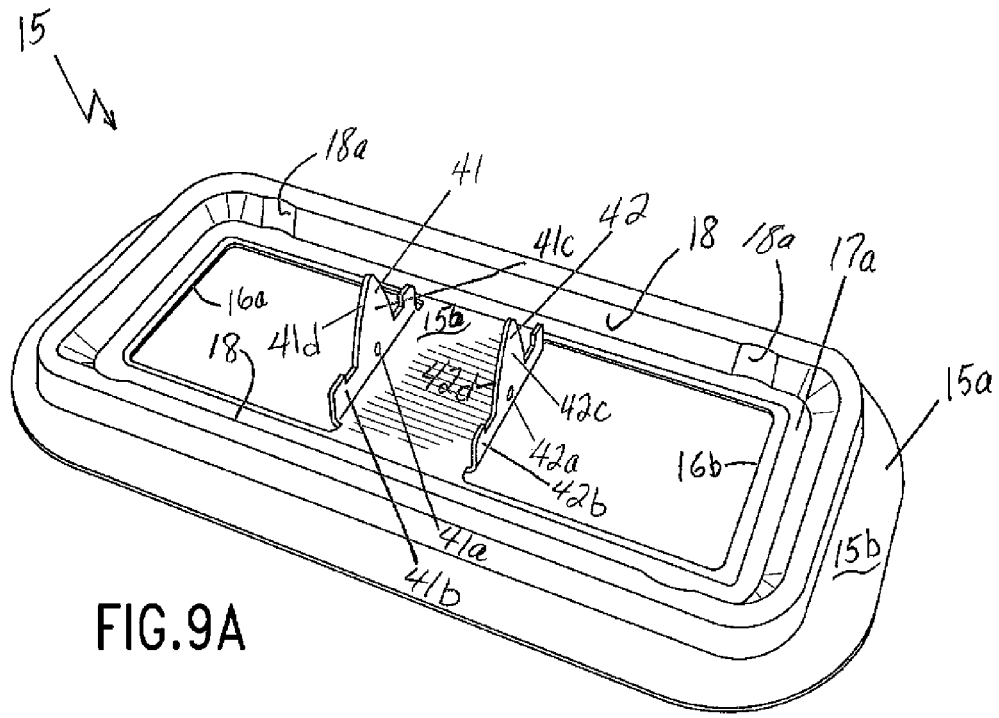
FIG. 9A is an elevated perspective view from the inwardly facing side of an embodiment of a component of the ventilator of the present disclosure.
Figure 9B:
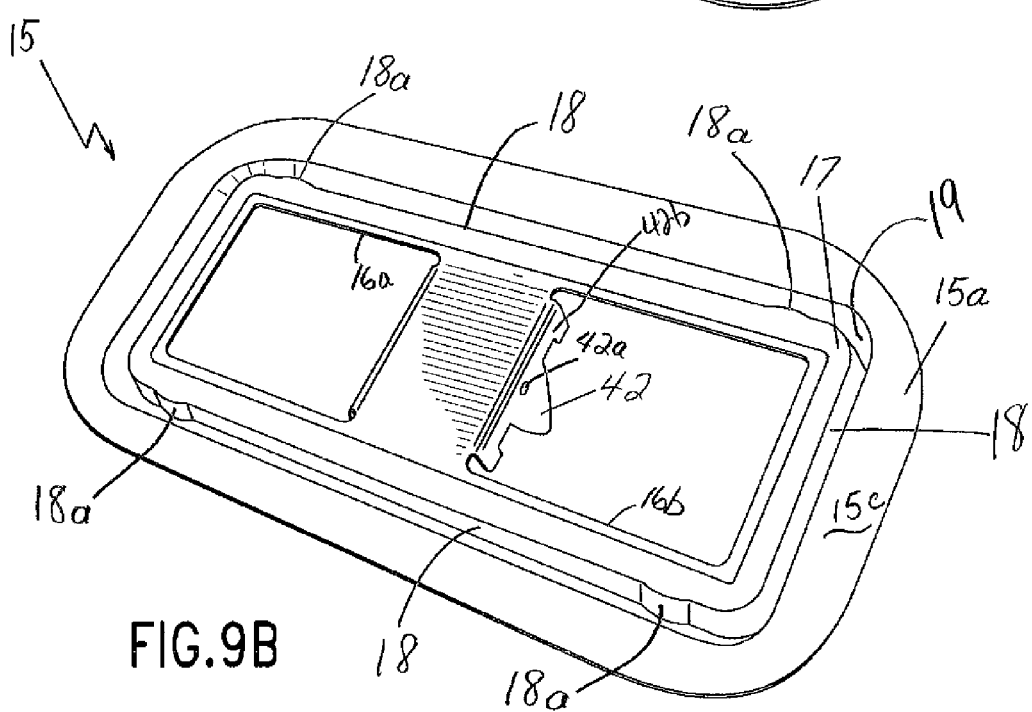
FIG. 9B is an elevated perspective view from the outwardly facing side of an embodiment of a component of the ventilator of the present disclosure.

As shown in FIGS. 2 and 3 for example, an embodiment of the two-way hingeless ventilator of the present disclosure comprises a generally planar-shaped frame 15, which is configured to be attached to the wall (e.g., 12 in FIG. 1) that defines the opening in which the ventilator is to be installed. As shown in FIGS. 9A and 9B for example, the frame 15 defines an outermost peripheral border flange 15a having an inner surface 15b extending generally in a first plane and an outer surface 15c that extends generally in a second plane that desirably is parallel to the plane defining the inner surface 15b. As shown in FIG. 5A, the outer surface 15c is disposed opposite the inner surface 15b. The outermost peripheral border flange 15a can be used as a platform for mounting the vent 11 in the opening defined in the wall, ceiling or floor of the environment in which the vent 11 is to be installed.

As shown in FIGS. 4, 9A and 9B for example, the frame 15 can further define a first opening 16a therethrough and a second opening 16b therethrough. Each of the first opening 16a and the second opening 16b is defined through both the inner surface 15b and the outer surface 15c of the frame 15. As shown in FIGS. 3, 9A and 9B for example, the first opening 16a is spaced apart from the second opening 16b.

Figure 5B:
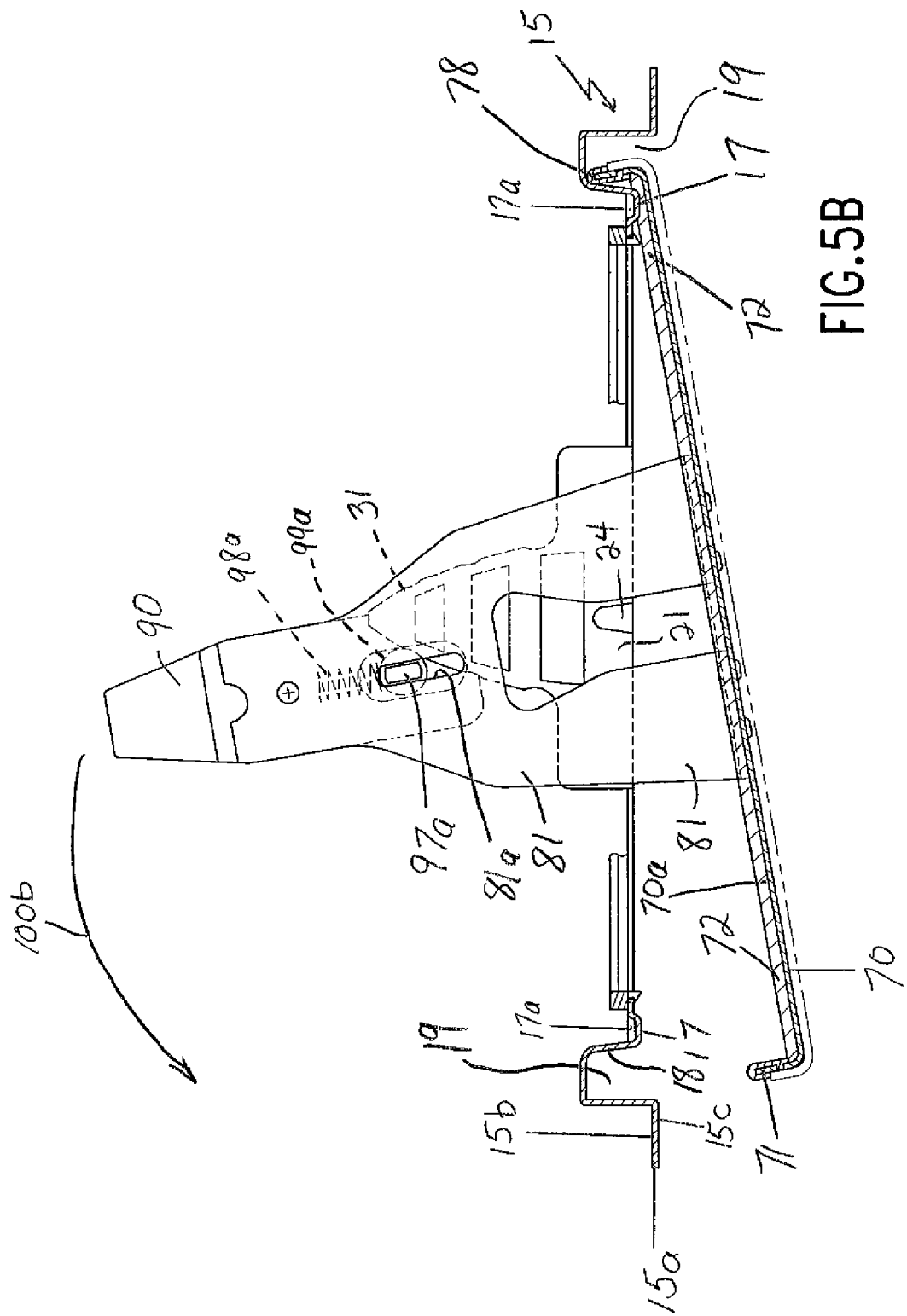
FIG. 5B is a cross-sectional view taken in the same direction as the view along the lines 5D-5D in the view shown in FIG. 4 but with the door of the ventilator positioned intermediate to the positions shown in FIGS. 5A and 5D.

As shown in FIGS. 8 and 9B for example, the outer surface 15c of the frame 15 defines a seating rim 17 that is configured to surround the first and second openings 16a, 16b and is generally disposed between the outermost peripheral border flange 15a and the first and second openings 16a, 16b. As shown in FIGS. 5B and 9B for example, the seating rim 17 is configured to extend generally spaced away from and protrudes from the plane of the outer surface 15c of the outermost peripheral border flange 15a of the frame 15. As shown in FIG. 8 for example, the seating rim 17 projects outwardly toward and faces the door 70.

As shown in FIGS. 4 and 9A for example, the ventilator can include a first upright 41 that extends from the inner surface 15b of the frame 15 in a direction that is generally perpendicular to the first plane in which the frame 15 is disposed. As shown in FIG. 9A, the first upright 41 desirably is disposed between the first opening 16a and the second opening 16b and closer to the first opening 16a than to the second opening 16b. As shown in FIG. 9A, the first upright 41 is desirably configured with a lower skirt portion 41b, which desirably extends generally almost the entire width of the first opening 16a of the frame 15. The lower skirt portion 41b is disposed beneath a generally triangularly shaped upper portion 41c that is defined by an outer edge 41d. As shown in FIG. 9A, the first upright 41 defines a detent opening 41a through the lower skirt portion 41b, and the detent opening 41a desirably is disposed beneath and directly in line with the apex of the triangularly shaped upper portion 41c.

As shown in FIG. 9A, a second upright 42 also can be provided and disposed to extend from the inner surface 15b of the frame 15 in a direction that is generally perpendicular to the first plane in which the frame 15 is disposed. As shown in FIG. 9A, the second upright 42 also is disposed between the first opening 16a and the second opening 16b, but closer to the second opening 16b than to the first opening 16a. Thus, the second upright 42 desirably is disposed spaced apart from but alongside the first upright 41. The second upright 42 desirably is configured as a mirror image of the first upright 41 and thus similarly is defined to include a lower skirt portion 42b, a detent opening 42a through the lower skirt portion 42b, and a generally triangularly shaped upper portion 42c that is defined by an outer edge 42d.

Desirably, a unitary sheet of metal can be cut and bent to form the frame 15 with its first upright 41 and second upright 42. In one exemplary embodiment, desirably, a sheet of aluminum or other suitable rigid material such as metal can be used to form the frame 15, the first upright 41 and the second upright 42. Because the seating rim 17 can be formed by being pressed into a metal sheet to form the frame 15, the reverse side of the seating rim 17 seen from the inner surface 15b of the frame 15 as shown in FIGS. 4, 5B, 7 and 9A for example, can appear as a trough 17a.

As shown in FIG. 8 for example, the ventilator 11 includes a door 70 that has a main body that is disposed to face the outer surface 15c of the frame 15. As shown in FIG. 5A, the door 70 has a generally planar inner surface 70a that is disposed to face the outer surface 15c of the frame 15. As shown in FIGS. 5A-5D, the door 70 is configured to be selectively positionable to cover and uncover both the first opening 16a and the second opening 16b.

Figure 11:
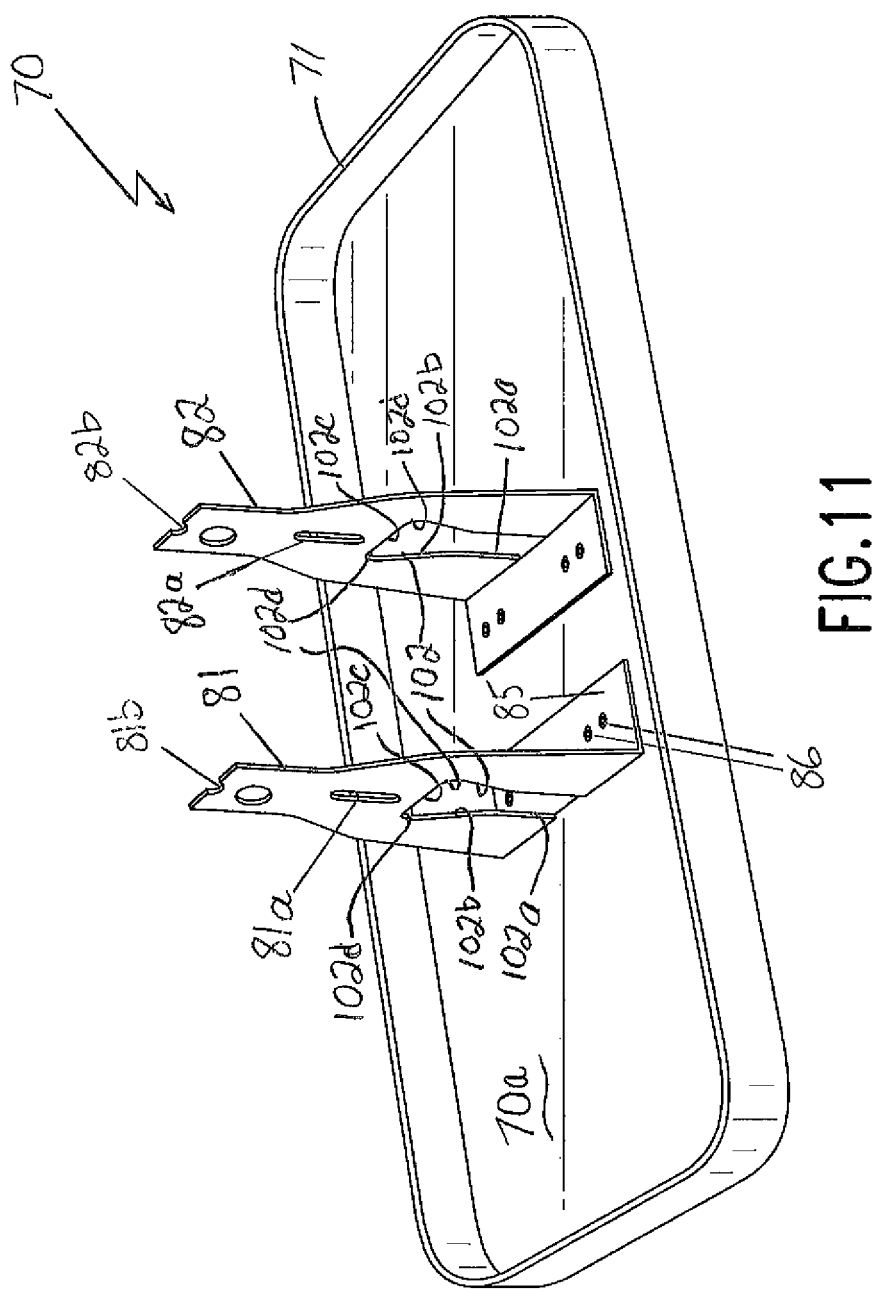
FIG. 11 is an elevated perspective view from the operator's side of an embodiment of the door.

As shown in FIG. 11 for example, a first door strut 81 can be connected to the main body of the door 70 and desirably to the inner surface 70a of the door 70. As depicted in new FIG. 11, for example, the first door strut 81 can be configured with a foot member 85 that is attached to the inner surface 70a of the door 70. Any known method of attachment can be used to connect the first door strut 81 to the main body of the door 70. For example, as shown in FIGS. 8 and 11, a plurality of rivets or spot welds 86 can be used to attach the foot member 85 (not visible in FIG. 8) to the door 70. As shown in FIGS. 3, 4, 5A and 11 for example, the first door strut 81 desirably extends in a direction generally perpendicular to the plane of the inner surface 70a of the door 70. As shown in FIG. 4 for example, the first door strut 81 is disposed so as to extend from the inner surface 70a of the door 70 and through the first opening 16a in the frame 15.

Figure 6:
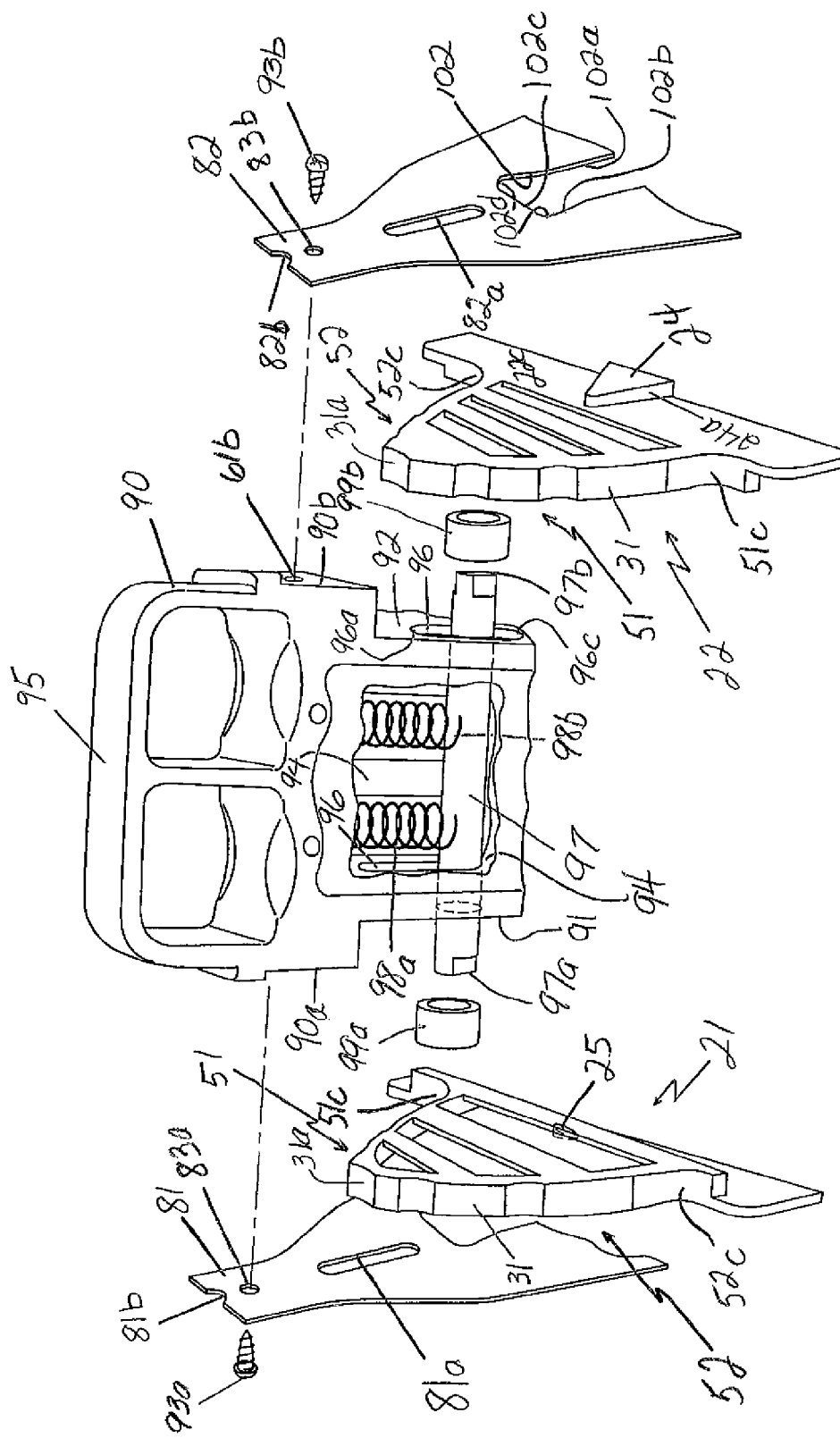
FIG. 6 is an elevated perspective view of components of an embodiment of the ventilator of the present disclosure schematically illustrating how these components are to be assembled.

As shown in FIGS. 6 and 11 for example, the first door strut 81 defines in the uppermost edge disposed at the end of the first door strut 81 that is opposite the foot member 85 (not shown in FIG. 6) that is attached to the inner surface 70a of the door 70, a first shallow recess 81b. The first shallow recess 81b desirably is disposed symmetrically at the middle of the uppermost edge that is disposed at the free end of the first door strut 81 that is opposite the foot member 85. As shown in FIGS. 6 and 11 for example, the first door strut 81 further defines therein a first elongated cutout 81a. The cutout 81a elongates desirably in a direction that is perpendicular to the plane of the inner surface 70a of the door 70 and desirably aligns with the first shallow recess 81b.

As shown in FIGS. 4 and 11 for example, the first door strut 81 further defines a first larger cutout 102 that defines a complex shape that is generally Y-shaped and is disposed between the first elongated cutout 81a and the foot member 85 (not visible in FIG. 4) and the inner surface 70a of the door 70 that is attached to the foot member 85. As schematically shown in FIG. 5A from the perspective shown by the arrows designated 5A in FIG. 3, the peripheral outline of the shape of the first Y-shaped larger cutout 102 desirably resembles an upper case letter Y. As shown in FIGS. 4, 5A and 11, the Y-shaped cutout 102 has a relatively narrower stem portion 102a that extends vertically in a linear direction normal to the inner surface 70a of the door 70 for about half of the overall distance of the Y-shaped larger cutout 102 above inner surface 70a of the door 70 and then begins to form a diverging portion 102b that widens laterally in a direction parallel to the inner surface 70a of the door 70 until attaining the full extent of the separation between the peripheral outline that defines each of the two branches that form the Y of the Y-shaped larger cutout 102. As schematically shown in FIG. 5A, the stem portion 102a of the first larger cutout 102 includes a generally rectangular shaped portion 102a that has one end disposed near the inner surface 70a of the door 70. As schematically shown in FIG. 4, the diverging portion 102b of the complex shape of the first Y-shaped larger cutout 102 further includes a generally trapezoidal shaped portion 102b that merges with and thus adjoins the rectangular shaped stem portion 102a. The relatively wider base 102c of the generally trapezoidal shaped portion 102b of the first larger cutout 102 is disposed closer to the first elongated cutout 81a than to the rectangular shaped stem portion 102a. Moreover, the base angles 102d of the generally trapezoidal shaped diverging portion 102b desirably are radiused in conformance with the shape of the rounded apex that defines the guide surface 24a of the guide stop 24 that protrudes from the outer surface 21c of the first upright sleeve 21 (described below).

As shown in FIGS. 6 and 11 for example, a second door strut 82 can be provided and can be configured identically to the first door strut 81. As shown in FIGS. 3 and 11 for example, the second door strut 82 can be connected similarly to the main body of the door 70 and desirably to the inner surface 70a of the door 70. As shown in FIG. 11 for example, the second door strut 82 desirably extends in a direction generally perpendicular to the plane of the inner surface 70a of the door 70. As shown in FIG. 3, the second door strut 82 is disposed so as to extend from the inner surface 70a of the door 70 and through the second opening 16b in the frame 15. As shown in FIGS. 6 and 11, the second door strut 82 defines therein a second elongated cutout 82a and a second shallow recess 82b. The second elongated cutout 82a elongates desirably in a direction that is perpendicular to the plane of the inner surface 70a of the door 70, and the second shallow recess 82b is defined in the uppermost edge of the second door strut 82.

As shown in FIGS. 6 and 11 for example, the second door strut 82 further defines a second larger Y-shaped cutout 102 that is disposed between the second elongated cutout 81a and the inner surface 70a of the door 70. The larger Y-shaped cutout 102 of the second door strut 82 similarly defines a complex peripheral shape that resembles the peripheral shape of an upper case letter Y with a triangularly shaped diverging portion 102b and a generally rectangular shaped stem portion 102a, which is disposed near the inner surface 70a of the door 70. The complex shape of the second larger Y-shaped cutout 102 of the second door strut 82 similarly further includes a generally trapezoidal shaped diverging portion 102b that merges with and thus adjoins the rectangular shaped stem portion 102a. The base 102c of the generally trapezoidal shaped diverging portion 102b of the second larger Y-shaped cutout 102 is disposed closer to the second elongated cutout 82a than to the rectangular shaped stem portion 102a. Moreover, the base angles 102d of the generally trapezoidal shaped diverging portion 102b desirably are radiused in conformance with the shape of the rounded apex that defines the guide surface 24a of the guide stop 24 that protrudes from the outer surface 22c of the second upright sleeve 22.

FIG. 6 depicts a perspective view of components of a partially assembled of a hingeless ventilator of the present invention. As shown in FIG. 6 for example, the hingeless ventilator desirably includes a first upright sleeve 21 spaced apart from a second upright sleeve 22. Each upright sleeve 21, 22 desirably is identically configured, and for convenience the remaining detailed description will refer to the first upright sleeve 21 unless appropriate to refer to the upright sleeve 22. As shown in FIG. 4 for example, a first upright sleeve 21 desirably is disposed between the two openings 16a, 16b in the frame 15. As shown in FIG. 4 for example, the first upright sleeve 21 can be connected to the frame 15 by being connected to the first upright 41 (FIG. 9A) and can extend in a direction that is generally perpendicular to the frame 15 and in particular to the inner surface 15b of the frame 15. As shown in FIG. 4, the first upright sleeve 21 can be configured to be mounted over the first upright 41 like a glove.

Figure 10A:
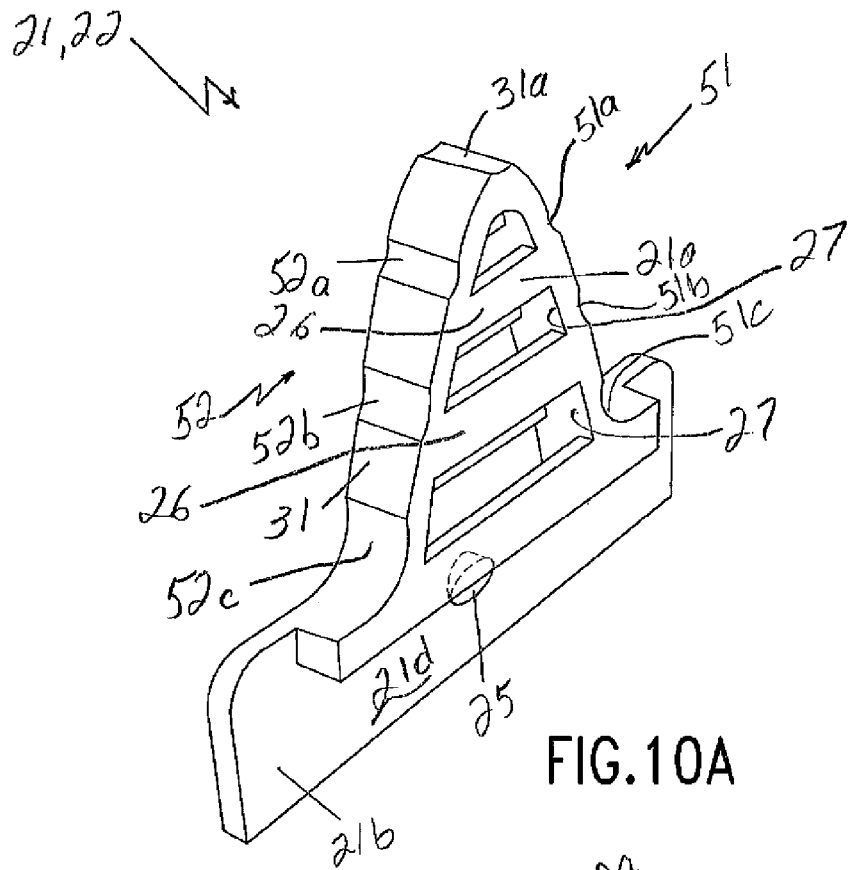
FIG. 10A is an elevated perspective view from beneath one side of an embodiment of a component of the ventilator of the present disclosure.
Figure 10B:
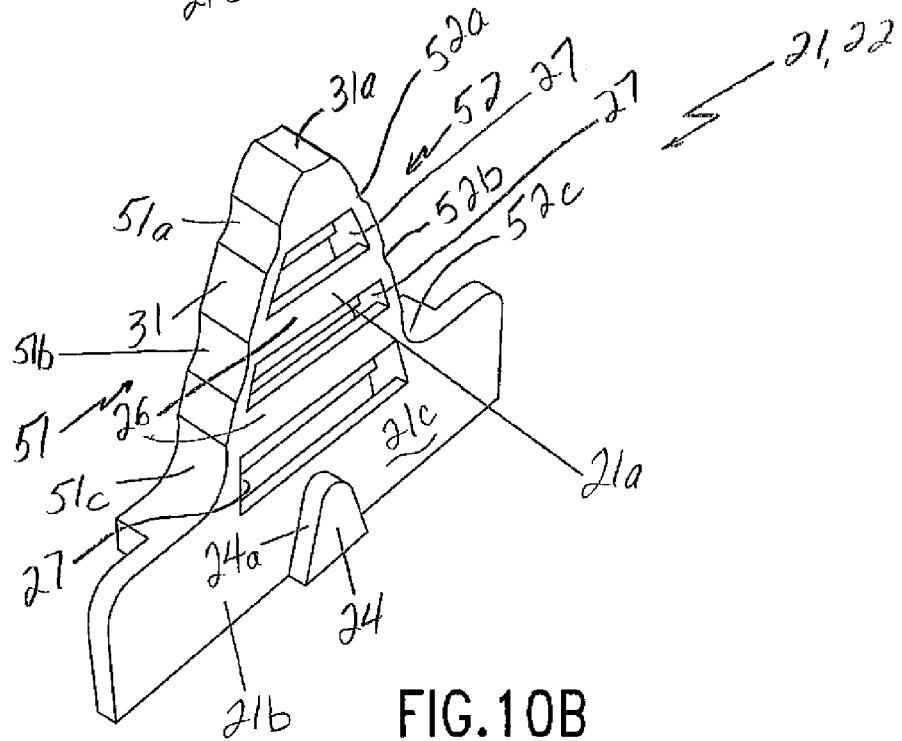
FIG. 10B is an elevated perspective view from the opposite side of the embodiment shown in FIG. 10A.

Each of FIGS. 10A, 10B, 10C and 10D depicts different views of upright sleeves that apply equally well to either the first or second upright sleeve 21, 22. But for convenience, the following description will refer only to the first upright sleeve 21. FIG. 10A shows an embodiment of the first upright sleeve 21 in a perspective view from the inner side, while FIG. 10B shows the same embodiment of the first upright sleeve 21 in a perspective view from the outer side, which is the opposite side from the inner side. When assembled as shown in FIG. 3 for example, the outer side of each upright sleeve 21, 22 faces toward the nearest end of the frame 15 of the frame's longer dimension, while the inner side of each upright sleeve 21, 22 faces toward the center of the frame 15.

As shown in FIG. 10B for example, the first upright sleeve 21 includes an upper section 21a and a contiguous base section 21b that is disposed beneath the upper section 21a. As shown in FIGS. 10A, 10B and 10C for example, the upper section 21a is defined generally by a triangular shape, while the base section 21b desirably defines a generally rectangular shape that desirably extends lengthwise beyond the extent of the base of the triangularly shaped upper section 21a. As shown in FIGS. 10A, 10B, 10C and 10D for example, the upper section 21a is defined generally by alternating cross braces 26 and cross gaps 27. As shown in FIG. 10D for example, the cross brace 26 on one side of the upper section 21a is opposed by a cross gap 27 and vice versa. So configured, each upright sleeve 21, 22 minimizes material, weight and cost without sacrificing structural integrity and ease of replacement.

As shown in FIG. 10B, a guide stop 24 extends in a direction that is normal to the outer surface 21c of the first upright sleeve 21. As shown in FIGS. 10B and 10C (in phantom), the guide stop 24 desirably is disposed generally symmetrically with respect to the opposite ends of the base section 21b of the first upright sleeve 21. As shown in FIGS. 6 and 10B, the guide stop 24 desirably defines a guide surface 24a that is configured with a shape resembling an isosceles triangle with a rounded apex. As schematically shown in FIG. 5D for example, the rounded apex of the guide surface 24a is configured to complement the shape of the radiused base angles 102d of the generally trapezoidal shaped portion 102b of the first larger cutout 102 of the first door strut 81. As shown in FIGS. 10B and 10C, the guide stop 24 desirably is disposed directly beneath the apex of the upper section 21a of the first upright sleeve 21 and with the apex of the guide surface generally directly in alignment with the apex of the upper section 21a of the first upright sleeve 21.

As shown in FIGS. 6, 10A, 10C and 10D, a detent 25 extends in a direction that is normal to the inner surface 21d surface of the first upright sleeve 21. As shown in FIGS. 10A and 10C, the detent 25 desirably is disposed generally symmetrically with respect to the opposite ends of the base section 21b of the first upright sleeve 21. As shown in FIGS. 10A and 10C, the detent 25 desirably is disposed directly beneath and generally directly in alignment with the apex of the upper section 21a of the first upright sleeve 21. As shown in FIGS. 3, 4 and 9B, the detent 25 is configured to be received within the opening 42a defined through the lower skirt portion 42b of the second upright 42 and so as to connect the second upright sleeve 22 to the first upright 42. Similarly, the detent 25 is configured to be received within the opening 41a defined through the lower skirt portion 41b of the first upright 41 and so as to connect the first upright sleeve 21 to the first upright 41.

As shown in FIG. 10D for example, the upper section 21a of the first upright sleeve 21 desirably defines an internal recess 21e that is configured with a shape that conforms to the generally triangular shaped outer edge 41d (FIG. 9A) that defines the upper portion 41c of the first upright 41 and thus snugly receives the generally triangular shaped upper portion of the first upright 41 in the internal recess 21e of the first upright sleeve 21. As shown in FIGS. 10A, 10C and 10D, the detent 25 that desirably is defined in the base section 21b of the first upright sleeve 21 retains the first upright sleeve 21 snugly mounted onto the first upright 41. Desirably, the outer edge 41d of the generally triangular shaped upper portion 41c of the first upright 41 rests snugly against the surface 21f (e.g., FIG. 10D) that defines the internal recess 21e of the first upright sleeve 21 when the detent 25 protruding from the inner surface 21d of the base section 21b of the first upright sleeve 21 engages through the detent opening 41a (FIG. 9A) defined through the lower skirt portion 41b of the first upright 41 and thereby connects the first upright sleeve 21 securely to the frame 15.

As shown in FIG. 10D, the detent 25 desirably is configured with a biased end surface 25a that is configured to facilitate sliding the first upright sleeve 21 over and down onto the upper portion 41c of the first upright 41 until the detent 25 becomes engaged in the detent opening 41a that is formed through the lower skirt portion 41b of the first upright 41. Since the first upright sleeve 21 desirably is formed of a plastic material, the first upright sleeve 21 bends sufficiently without breaking so that the detent 25 can be pushed through and out of the detent opening 41a in order to slide the first upright sleeve 21 off of the first upright 41 if replacement of the first upright 41 is desired.

As shown in FIG. 10D for example, the width of the internal recess 21e in the first upright sleeve 21 is schematically indicated in FIG. 10D by the space between the arrows designated 23a and 23b, and that space is designed to receive snugly therein the first upright 41. Accordingly, the first upright sleeve 21 can be disposed and configured to be mounted snugly over the first upright 41. As shown in FIG. 10D for example, the distance by which the detent 25 protrudes away from the inner surface 21d of the base section 21b of the first upright sleeve 21 is schematically indicated in FIG. 10D by the space between the arrows designated 23a and 25b, which desirably will be comparable to the thickness of the first upright 41.

As shown in FIGS. 6, 10A, 10B and 10C, the exterior edge of the upper section 21a of an embodiment of the first upright sleeve 21 desirably can define a first exterior track surface 31, which follows a triangular path resembling the letter "A" in cross-section. As shown in FIGS. 10A and 10B for example, the first exterior track surface 31 includes a first forward edge 51 and a first rearward edge 52, which is disposed opposite the first forward edge 51 and not completely visible in the view shown in FIGS. 10A and 10B. As shown in FIGS. 10A and 10B, for example, the first exterior track surface 31 includes a first apex surface 31a at the highest point in the path. The first apex surface 31a is an indent that defines a concave surface and is disposed between the first forward edge 51 and the first rearward edge 52. As shown in FIGS. 10A and 10B, the first forward edge 51 and the first rearward edge 52 define in general the shape of an isosceles triangle that tapers towards the first apex surface 31a of the first upright sleeve 21.

As shown in FIGS. 10A and 10B for example, each of the first forward edge 51 and the first rearward edge 52 of the first exterior track surface 31 defines a plurality of respective indents 51a, 51b, 51c, 52a, 52b, 52c. The number and spacing of the indents can be varied depending on a number of factors, and one such factor is the size of the ventilator 11. Another such factor is the number and positioning of rest settings desired for the two-way pivoting door 70 (e.g., FIG. 4) of the ventilator 11. As shown in FIGS. 10A, 10B and 10C, beginning where the upper section 21a meets the base section 21b, the first forward edge 51 defines a first lower indent 51c, which as shown in FIG. 4, is to be disposed closer to the frame 15 than to the first apex surface 31a. The first forward edge 51 also can be configured to define a first middle indent 51b that is disposed between the first lower indent 51c and the first apex surface 31a of the first exterior track surface 31. The first forward edge 51 also can be configured to define a first upper indent 51a that is disposed between the first middle indent 51b of the first forward edge 51 and the first apex surface 31a of the first exterior track surface 31.

Desirably, as shown in FIGS. 10A, 10B and 10C for example, the first forward edge 51 and the first rearward edge 52 of the first upright sleeve 21 are configured as mirror images of each other. Thus, the first rearward edge 52 similarly defines a first lower indent 52c that is disposed where the upper section 21a of the first upright sleeve 21 meets the base section 21b and closer to the frame 15 than to the first apex surface 31a. The first rearward edge 52 also defines a first middle indent 52b that is disposed between the first lower indent 52c and the first apex surface 31a. The first rearward edge 52 also defines a first upper indent 52a that is disposed between the first middle indent 52b and the first apex surface 31a.

However, by arranging the spacing of the indents in the first forward edge 51 in a manner that differs from the spacing of the indents in the first rearward edge 52, it is possible to have different rest settings for the door 70 with respect to the frame 15 depending on which opposite side of the frame 15 the door 70 is tilted.

As shown in FIG. 4 for example, a second upright sleeve 22, which desirably is an identical component as the first upright sleeve 21, desirably is disposed between the two openings 16a, 16b in the frame 15. As shown in FIG. 4 for example, the second upright sleeve 22 can be connected to the inner surface 15b of the frame 15 by the second upright 42 of the frame 15 and can extend in a direction that is generally perpendicular to the frame 15. As shown in FIG. 4, the second upright sleeve 22 can be disposed and configured to be mounted over the second upright 42.

As shown in FIG. 6, the second upright sleeve 22 desirably defines an exterior track surface 31, which is identical to the exterior track surface 31 of the first upright sleeve 21. As shown in FIG. 6, for example, the exterior track surface 31 the of the second upright sleeve 22 includes an apex surface 31a that is disposed between a forward edge 51 and a rearward edge 52, which is disposed opposite the forward edge 51 and not completely visible in the view shown in FIG. 6. Similarly, by arranging the spacing of the indents in the forward edge 51 in a manner that differs from the spacing of the indents in the rearward edge 52, it is possible to have different rest settings for the door 70 with respect to the frame 15 depending on which opposite side of the frame 15 the door 70 is tilted.

As shown in FIG. 4 for example, the hingeless ventilator 11 includes a handle 90 that has a first side 90a and a second side 90b opposite the first side 90a. The first side 90a of the handle 90 is connected to the first door strut 81, and the second side 90b of the handle 90 is connected to the second door strut 82. As schematically shown in FIG. 4, the first side 90a of the handle 90 defines a first handle detent 90c that is configured to be received in and held in the first shallow recess 81b that is defined in the uppermost edge that is disposed at the free end of the first door strut 81. The second side 90b of the handle 90 is configured as the mirror image of the first side 90a of the handle 90. Accordingly, though not visible in the view of FIG. 4, the second side 90b of the handle 90 defines a second handle detent that is identical to the first handle detent 90c but that is configured to be received in and held in the second shallow recess 82b that is defined in the uppermost edge that is disposed at the free end of the second door strut 82. The combined effects of the handle detents, the shallow recesses 81b, 82b and the screws 93a, 93b (FIG. 6) extending through the respective door struts 81, 82 and the handle 90 securely fasten and connect the handle 90 to the door struts 81, 82.

The handle 90 can be thought of as defining an upper body and a lower body. As shown in FIG. 3 for example, when connected to the door struts 81, 82, the distance between the handle's lower body and the frame 15 is less than the distance between the handle's upper body and the frame 15. As shown in FIG. 6 for example, the handle's upper body is desirably configured with a gripping surface 95 for the hand of an operator to facilitate manipulation and movement of the handle 90 by the operator. As schematically shown in FIG. 6, the handle's upper body can be connected to the first door strut 81 and to the second door strut 82 via openings 83a, 83b defined respectively through the door struts 81, 82 by means of a pair of threaded screws 93a, 93b. As schematically shown in FIG. 6, the handle's upper body can be provided with a bore 61b that receives the threaded screw 93b to secure the second door strut 82 to the second side 90b of the handle 90. Though not visible in the view of FIG. 6, a similar bore is provided on the first side 91 of the handle 90 to receive therein the threaded screw 93a to secure the first door strut 81 to the first side 91 of the handle 90.

As shown in FIG. 6, the lower body of the handle 90 defines a first side 91 and a second side 92 that is disposed opposite the first side 91. As schematically shown in FIG. 6, the lower body of the handle 90 is partially cut away in a wavy lined rectangle to reveal the interior of a hollow inner chamber 94 that is defined within the lower body of the handle 90 and is disposed between the first side 91 of the handle and the second side 92 of the handle. As shown in FIG. 6, each of the first side 91 and second side 92 of the handle 90 defines an elongated first slot 96 that communicates with the inner chamber 94. As shown in dashed line in FIG. 5A (so as to indicate that it would not be visible in the view shown in FIG. 5A), the first slot 96 has a first upper end 96a and a first lower end 96c that is disposed opposite the first upper end 96a. Each of the first upper end 96a and the first lower end 96c is configured with a semicircular shape to receive therein a cylindrically shaped surface. As shown in FIG. 5A, when the handle 90 is connected to the first door strut 81, the handle's upper body is disposed farther from the first lower end 96c of the first slot 96 than from the first upper end 96a of the first slot 96.

The second side 92 of the handle's lower body is configured identically as the first side 91. As shown in FIG. 6, the second side 92 of the handle's lower body thus defines an elongated second slot 96 that communicates with the inner chamber 94 and is configured the same as the first slot 96. Thus, as shown in FIG. 6, the second slot 96 has a second upper end 96a and a second lower end 96c that is disposed opposite the second upper end 96d and configured with a semicircular shape. When the handle 90 is connected to the second door strut 82, the upper body of the handle 90 is disposed farther from the second lower end 96c of the second slot 96 than from the second upper end 96a of the second slot 96.

As shown in FIG. 6, an elongated axle 97 has a first end 97a and a second end 97b that is disposed opposite the first end 97a. The axle 97 desirably has a cylindrical shape except at the first end 97a and the second end 97b. As shown in FIG. 6, the axle 97 is disposed so as to extend through each elongated first and second slot 96 and the hollow inner chamber 94 of the handle 90. The first end 97a of the axle 97 extends beyond the first side 91 of the handle 90, and the second end 97b of the axle 97 extends beyond the second side 92 of the handle 90. As schematically shown in FIGS. 2, 3, 4 and 6 for example, the first end 97a Of the axle 97 is configured so as to be slideably held in the first elongated cutout 81a of the first door strut 81 and thus slideably engages the first door strut 81. Though not visible in the views shown in FIGS. 2, 3 and 4, the second end 97b of the axle 97 is similarly slideably held in the second elongated cutout 82a of the second door strut 82 and thus similarly slideably engages the second door strut 82.

As shown in FIG. 6 for example, at least a first spring 98a is disposed in the inner chamber 94 of the handle 90 so as to bias the axle 97 toward the first lower end 96c of the first slot 96 that is defined through the first side 91 of the lower body of the handle 90. Similarly, the first spring 98a biases the axle 97 toward the second lower end 96c of the second slot 96 that is defined through the second side 92 of the lower body of the handle 90. As shown in FIG. 6 for example, desirably a second spring 98b also is disposed alongside the first spring 98a to provide twice the biasing force that tends to push the axle 97 toward the lower ends 96c of the slots 96 defined through the sides 91, 92 of the lower body of the handle 90. The force constant of the springs 98a, 98b will depend on the size of the vent and its components. However, when a pair of springs 98a, 98b is provided in some embodiments, each of the springs 98a, 98b desirably has a force constant on the order of 10 pounds of force per inch.

As shown in FIGS. 3 and 6 for example, a first roller 99a is rotatably mounted on the axle 97 and is shaped as a wheel having a cylindrical exterior surface. As shown in FIG. 6 for example, the first roller 99a desirably is disposed between the first end 97a of the axle 97 and the first side 91 of the lower body of the handle 90. As shown in FIGS. 5A-5D for example, the first roller 99a is biased by at least one of the springs 98a in the handle 90 so as to be contacting the first exterior track surface 31 of the first upright sleeve 21. Thus, the first roller 99a provides a rolling engagement between the handle 90 that is attached to the door 70 on the one hand and the first upright sleeve 21 that is attached to the frame 15 on the other hand. Relative movement between the handle 90 and the frame 15 effects correspondingly different positions of the door 70 relative to the two openings 16a, 16b in the frame 15.

As schematically shown in FIG. 6 for example, a second roller 99b is rotatably mounted on the axle 97. As shown in FIG. 6 for example, the second roller 99b desirably is disposed between the second end 97b of the axle 97 and the second side 92 of the lower body of the handle 90. Though not visible in the view shown in FIGS. 5A-5D for example, the second roller 99b is biased by at least one of the springs 98a, 98b in the handle 90 so as to be contacting the exterior track surface 31 of the second upright sleeve 22. Thus, the second roller 99b provides a rolling engagement between the handle 90, which is attached to the door 70, and the second upright sleeve 22, which is attached to the frame 15. Since the handle 90 and the door 70 are fixed to one another, relative movement between the handle 90 and the frame 15 effects correspondingly different positions of the door 70 relative to the two openings 16a, 16b in the frame 15. Moreover, relative movement between the handle 90 and the frame 15 corresponds to relative movement between the rollers 99a, 99b and the respective exterior track surface 31 of the first upright sleeve 21 and the exterior track surface 31 of the second upright sleeve 22.

As shown in FIG. 8 for example, the door defines a lip 71 that surrounds the periphery of the main body of the door 70. As shown in FIG. 5B for example, the lip 71 extends in a direction that generally is perpendicular to the generally planar inner surface 70a of the main body of the door 70. In a sense, the lip 71 forms a skirt around the edge of the planar main body of the door 70.

Figure 5C:
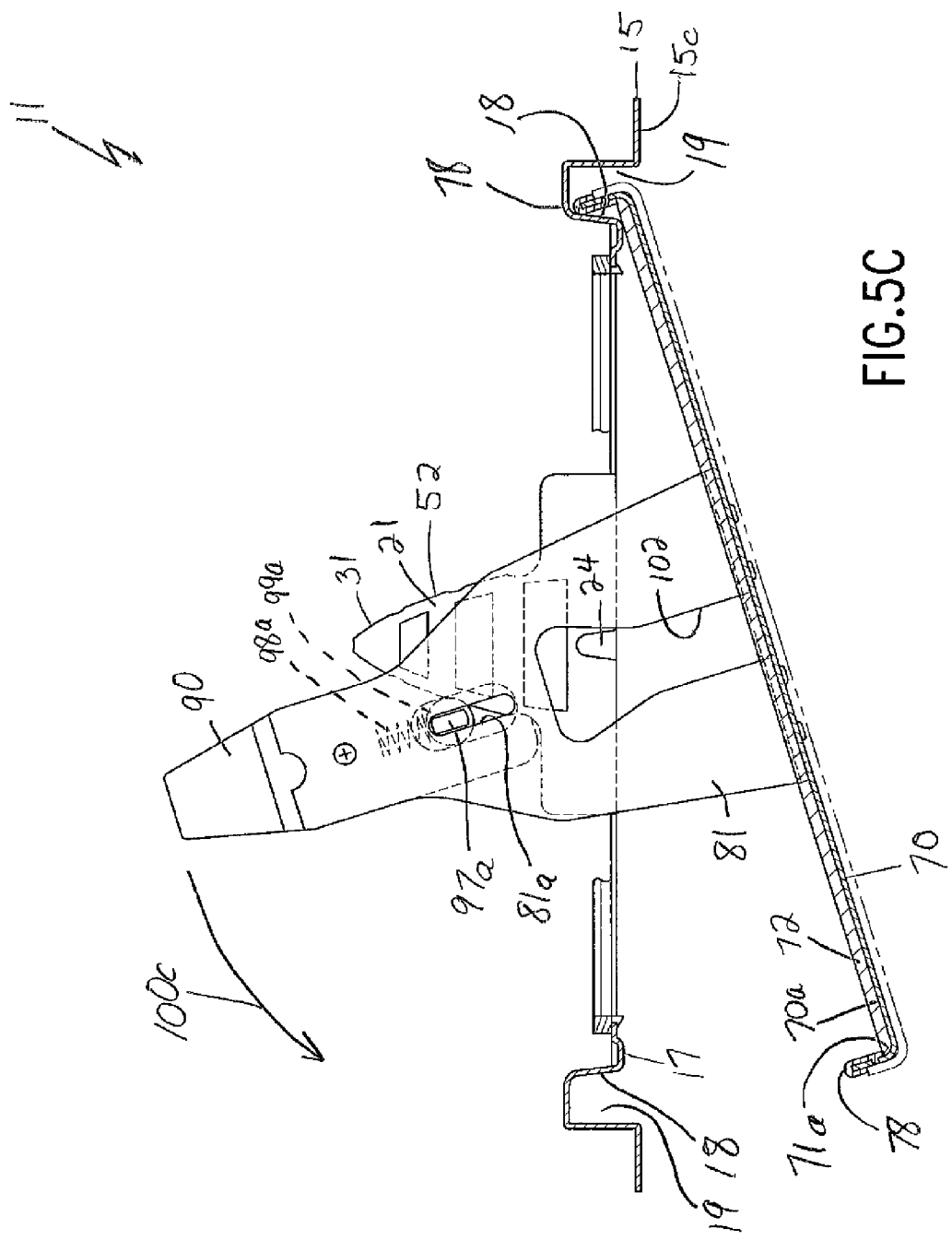
FIG. 5C is a cross-sectional view taken in the same direction as the view along the lines 5D-5D in the view shown in FIG. 4 but with the door of the ventilator positioned intermediate to the positions shown in FIGS. 5B and 5D.
Figure 5D:
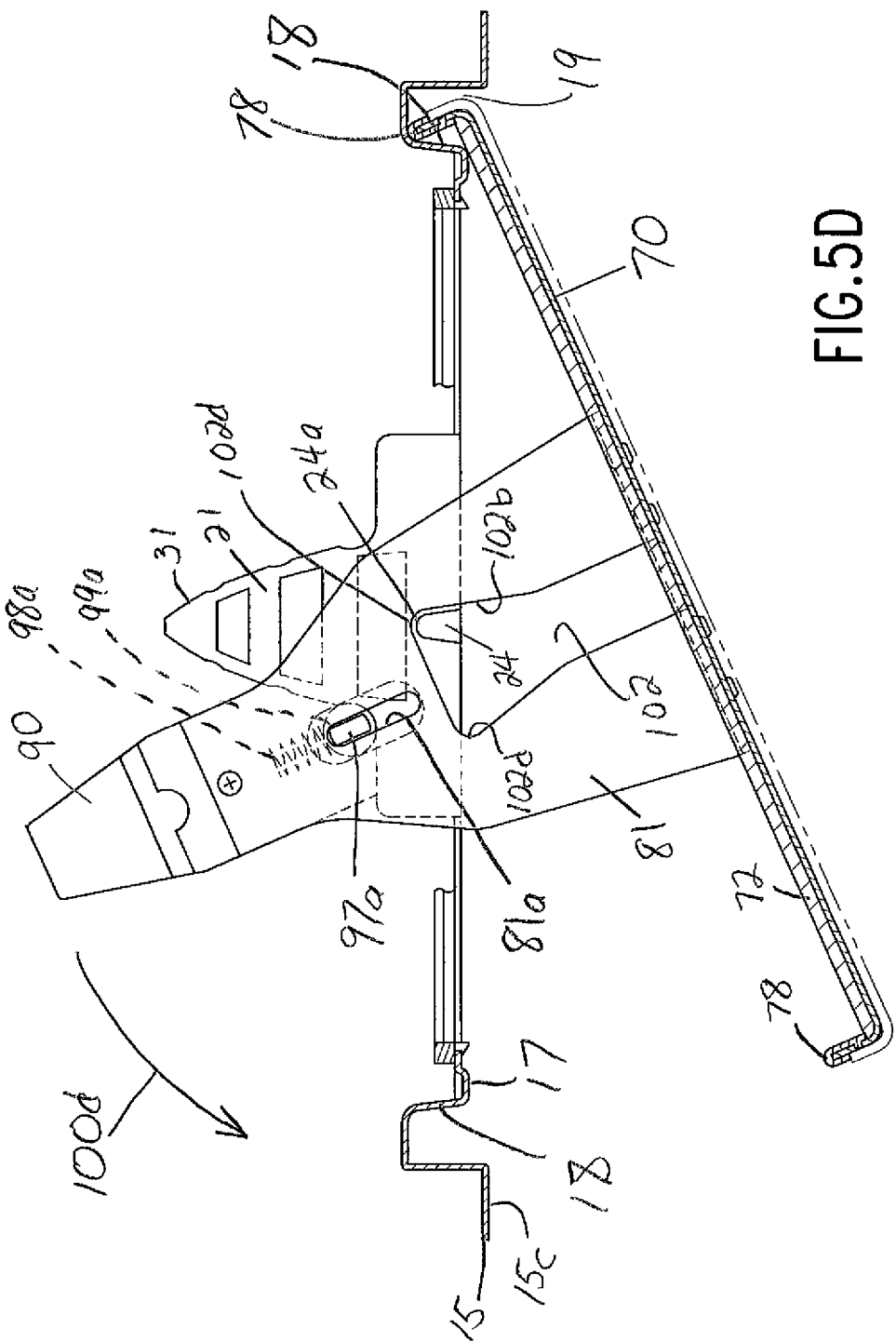
FIG. 5D is a cross-sectional view taken along the lines 5D-5D in the view shown in FIG. 4.

As shown in FIG. 5C for example, a gasket 72 desirably is disposed on and covers most of the inner surface 70a (see FIG. 11) of the door 70 and extends so as to butt against the inner surface 71a of the lip 71 that surrounds the main body of the door 70. As shown in FIG. 5B for example, the gasket 72 desirably is resiliently deformable and provides a seal against the sealing rim 17 of the frame 15 as the door 70 moves toward the closed position. Thus, the gasket 72 helps seal the vent against the intrusion of air drafts, moisture and particulate matter. The gasket 72 also can serve a sound-deadening function. For example, the gasket 72 also prevents metal surfaces of the lip 71 of the door 70 from touching metal surfaces of the frame 15 and that might generate wear, paint removal and annoying noises of metal scraping against metal.

Figure 7:
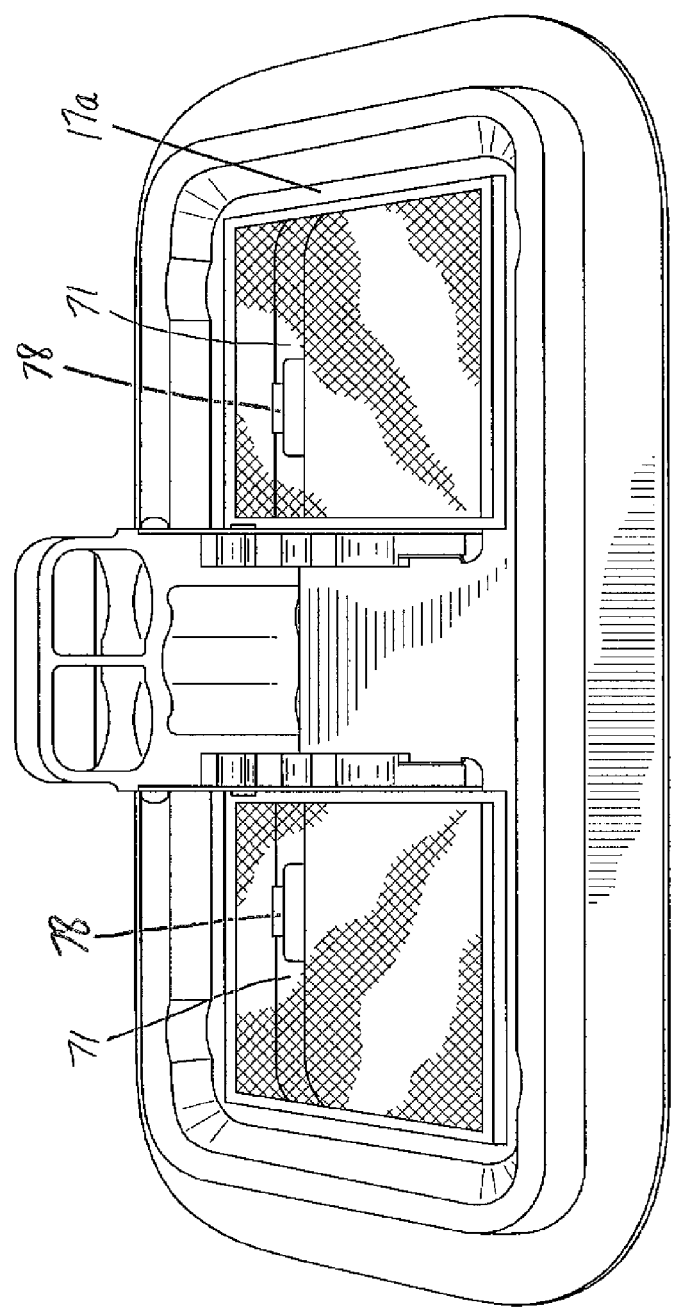
FIG. 7 is an elevated perspective view from the operator's side of an embodiment of the ventilator of the present disclosure schematically indicating assembly of a screen into one of the two openings through the ventilator with the door in the completely closed position.

As shown in FIGS. 7 and 8, desirably at least one door glide 78 is connected to a portion of the free edge of the lip 71 of the door 70. As shown in FIGS. 7 and 8 for example, a plurality of door glides 78 desirably is provided. As shown in FIGS. 5D, 7 and 8 for example, each door glide 78 can be formed so as to overlap both a portion of the interior surface 71a of the lip 71 and the exterior surface of the lip 71 in an uninterrupted fashion. As shown in FIG. 8 for example, each door glide 78 can be provided with a pair of detents 78a. Each detent 78a of each door glide 78 can be configured to be snap-fitted through one of a pair of spaced apart holes 73a, which can be drilled through a portion of the lip 71 of the door 70 as shown schematically in FIG. 8 for example. However, other means of attachment of the glide 78 to the lip 71 can be used and would include the use of various adhesives instead of or in addition to the snap-in fit of the detents into the holes 73a in the lip 71. Moreover, each door glide 78 desirably can be attached to the lip 71 so that the detents 78a face the interior of the door 70 instead of facing the exterior of the door 70 as depicted in FIG. 8.

As shown in FIGS. 9A and 9B for example, an outward wall 18 partly defines the seating rim 17 of the frame 15. As shown in FIGS. 5A-5D, 8 and 9B for example, the outer surface 15c of the frame 15 desirably can be configured to define a door recess 19 that is configured to surround the seating rim 17 and is partly defined by the outward wall 18 that partly defines the seating rim 17. As shown in FIGS. 5A-5D for example, the door recess 19 desirably can be configured to provide space for receiving the lip 71 of the door 70 so as to dispose the outer surface 70b of the main body of the door 70 in an even plane with the outer surface 15c of the outermost peripheral border flange 15a of the frame 15 when the door 70 is closed. In this way, a smooth aerodynamic surface is presented when the door 70 is closed, and this is advantageous for reducing drag when the vent 11 is installed in a vehicle 14 that moves through the air with the outer surface 70b of the main body of the door 70 disposed outside the vehicle 14.

Desirably, as shown in as shown in FIGS. 5B-5D and 8 for example, at least one door glide 78 is disposed in registry with each side of each opening 16a, 16b through the frame 15 so as to facilitate smooth engagement between the lip 71 of the door 70 and the outward wall 18 that partly defines the seating rim 17 of the frame 15. Moreover, as shown in FIGS. 5B-5D for example, each door glide 78 slides against the surface of the outward wall 18 that partly defines the door recess 19 and partly defines the seating rim 17 of the frame 15 when the door 70 pivots relative to the frame 15 during movements of the door 70 to various positions of relatively uncovering the first and second openings 16a, 16b of the frame 15. In this way, the door glides 78 also prevent metal surfaces of the door 70 from touching metal surfaces of the frame 15 that might thereby generate wear, paint removal and annoying noises of metal scraping against metal. In an embodiment like the one shown in FIG. 8, which includes a generally rectangular-shaped frame 15 and a pivoting axis of the door 70 of the ventilator 11 is disposed along an axis extending parallel to the longer length of the rectangular shape of the frame 15, the door glides 78 desirably will be disposed on each of the longer lengths that define the lip 71 of the door 70 (or the seating rim 17).

As shown in FIGS. 9A and 9B for example, a plurality of dimples 18a can be formed in the outward wall 18 that partly defines the seating rim 17. As shown in FIG. 9A for example, each of these dimples 18a includes a concave surface that desirably faces inwardly toward the center of the frame 15. As shown in FIG. 9B for example, each of these dimples 18a includes a convex surface that desirably extends outwardly in a direction that is facing away from the center of the frame 15. Each of these dimples 18a projecting from the outward wall 18 of the seating rim 17 desirably can be disposed on each of the longer lengths of the seating rim 17 that extend in a direction that is parallel to the pivoting axis of the door 70 of the ventilator 11. Moreover, each of these dimples 18a desirably can be disposed on each of the longer lengths of the seating rim 17 so that the dimple 18a is not aligned with any of the door glides 78. Under normal circumstances, the door glides 78 desirably are configured so that they will serve as a stop for the leading edge of the door 70 before any contact would be made with any of the dimples 18a, and thus most embodiments do not need to include dimples 18a. However, in embodiments that include dimples 18a, if a circumstance does arise in which the door glides 78 were missing, the convex surface of the dimple 18a then would serve as a stop for the leading edge of the door 70 when the door 70 is fully opened to one side of the vent 11.

Operation of a presently desirable embodiment of the two-way hingeless ventilator 11 now will be described. Each of FIGS. 2, 3, and 5A illustrates the ventilator 11 in the completely closed position. The first upright sleeve 21 with its first exterior track surface 31 having a first forward edge 51 and an oppositely disposed mirror image first rearward edge 52 are shown in dashed outline in FIG. 5A. In the completely closed position, each of the first roller 99a and the second roller 99b rests on the respective apex surface 31a of the exterior track surface 31 on the first upright sleeve 21 and (though not visible in FIG. 5A) the apex surface 31a disposed on the exterior track surface 31 of the second upright sleeve 22. From this fully closed position, which is shown in cross-section in FIG. 5A, the operator can pull the handle 90 in the direction of the arrow designated 100b in FIG. 5B. In so doing, the first and second rollers 99a, 99b move along the respective forward edges 51 of the respective exterior track surfaces 31 of the first and second upright sleeves 21, 22 so that the respective roller 99a, 99b rests within the respective indent 51a, that is closest to the apex surfaces 31a of the first and second upright sleeves 21, 22. Desirably, the arcuate shape of each indent 51a, 51b, 51c, 52a, 52b, 52c formed in the first exterior track surfaces 31 of the first and second upright sleeves 21 conforms to the arcuate shape of the exterior surface of the respective rollers 99a, 99b.

As the handle moves in the direction designated 100b in FIG. 5B, the springs 98a, 98b will push the axle 97 so that the first roller 99a and the second roller 99b maintain contact respectively with the exterior track surfaces 31 of the first and second upright sleeves 21, 22. Thus, the respective springs 98a, 98b bias the respective rollers 99a, 99b against the respective exterior track surfaces 31 of the respective upright sleeves 21, 22 during movement of the handle 90 and door 70 with respect to the frame 15. Movement of the handle 90 in the direction 100b in FIG. 5B pivots the door 70 away from the frame 15 on one side edge of the door 70, while compressing the gasket 72 disposed at the opposite side edge of the door 70. As shown in FIG. 5B where the portion of the lip 71 of the door 70 has remained within the door recess 19, the seating rim 17 has caused a portion of the gasket 72 near that portion of the lip 71 of the door 70 to become more compressed than when the door 70 was disposed in the closed position shown in FIG. 5A and thereby assures an airtight tight seal between that edge of the door 70 and that side of the frame 15. As shown in FIG. 5B, as the positions of the respective rollers 99a, 99b come to rest in the respective indents 51a (FIG. 6) of the respective exterior track surfaces 31 of the respective upright sleeves 21, 22 (FIG. 6), the position of the guide stop 24 on outer surface 21c of first upright sleeve 21 changes with respect to the larger cutout 102 in the first door strut 81 and moves to a position that is still within the rectangular shaped portion 102a but closer to the trapezoidal shaped portion 102b. The same thing happens to the position of the guide stop 24 on outer surface 21c of second upright sleeve 22 with respect to the second door strut 82.

Further movement of the handle 90 in the direction 100c in FIG. 5C continues to pivot the door 70 away from the frame 15 on one side edge of the door 70, while further compressing the gasket 72 disposed at the opposite edge of the door 70. As shown in FIG. 5C, as the positions of the respective rollers 99a, 99b come to rest in the respective indents 51b (FIG. 6) of the respective exterior track surfaces 31 of the respective upright sleeves 21, 22 (FIG. 6), the position of the guide stop 24 on outer surface 21c of first upright sleeve 21 changes with respect to the larger cutout 102 in the first door strut 81 and moves to a position that is beyond the rectangular shaped portion 102a but within the trapezoidal shaped portion 102b. The same thing happens to the position of the guide stop 24 on outer surface 21c of second upright sleeve 22 with respect to the second door strut 82.

In the embodiment shown in FIG. 5D, further movement of the handle in the direction of the arrow designated 100d results in the maximum opening of the door 70 away from the frame 15 on one side of the frame 15 and the maximum compression of the door gasket 72 near the lip 71 on the opposite side of the door 70. The view shown in FIG. 5D generally corresponds to the configuration of the ventilator 11 shown in FIG. 4 for example. Note that as the door 70 of ventilator 11 moves from the fully closed position of FIG. 5A to the fully open position of FIG. 5D, the end 97a of the elongated axle 97 slides within the elongated cutout 81a of the first door strut 81 in the direction away from the larger cutout 102 of the first door strut 81.

As shown in FIG. 5D, as the positions of the respective rollers 99a, 99b come to rest in the respective indents 51c (FIG. 6) of the respective exterior track surfaces 31 of the respective upright sleeves 21, 22 (FIG. 6), the position of the guide stop 24 on outer surface 21c of first upright sleeve 21 changes with respect to the first door strut 81 and moves to a position that is within one of the base angles 102d of the trapezoidal shaped portion 102b of the larger cutout 102. The same thing happens to the position of the guide stop 24 on outer surface 21c of second upright sleeve 22 with respect to the second door strut 82. If the handle 90 were to be moved to the same extent but in the direction opposite to the direction of arrow 100d in FIG. 5D, then the position of the guide stop 24 on outer surface 21c of first upright sleeve 21 would move to the position that is within the other one of the base angles 102d of the trapezoidal shaped portion 102b of the larger cutout 102. Thus, the door 70 of the ventilator 11 can be opened to either one of the opposite sides of the frame 15, as the user desires. Moreover, the interaction of each of the Y-shaped cutouts 102 of each of the door struts 81, 82 with each respective guide stop 24 of each respective upright sleeve 21, 22 that extends through the Y-shaped cutout 102 ensures that neither jerking motion on the handle 90 nor awkwardly pulling on the handle 90 causes any misalignment of either of the rollers 99a, 99b from its respective track surface 31 on its respective upright sleeve 21, 22.

As shown in the chain dashed line outlines in FIGS. 5A and 8, an embodiment of the ventilator can include a decorative shell 75 that is connected to the door 70. The decorative shell 75 desirably defines an interior surface 75a and an exterior surface 75b that is disposed opposite the interior surface 75a. As shown in FIG. 5A, the interior surface 75a of the shell 75 is disposed in opposition to the outer surface 70b of the door 70. As shown in FIG. 5A, the turned up peripheral flange 76 of the decorative shell 75 desirably conforms to the lip 71 of the door 70, and the free edges of the turned up peripheral flange 76 butts against the free edges of the door glides 78 that are connected to the lip 71 of the door 70.

The decorative shell 75 desirably is formed of suitable material, which can include a thinner gauge of metal than is used to form the door 70. In one embodiment where the door 70 is formed of 16 gauge stainless steel, the decorative shell 75 desirably can be formed of 22 gauge stainless steel for example. The exterior surface 75b of the decorative shell 75 desirably can be painted or otherwise textured in order to present an aesthetically pleasing appearance to the viewer.

As shown in FIGS. 2, 3 and 8 for example, the ventilator 11 desirably may include a first screen 35 and a second screen 36. As shown in FIG. 3 for example, the first screen 35 is configured to be disposed in the first opening 16a of the frame 15. Desirably, the second screen 36 is provided to cover the second opening 16b and is configured in the same manner as described below for the first screen 35. Desirably, both screens 35, 36 can be configured to be selectively detachable from the frame 15 by the user.

As shown in FIG. 3 for example, the first screen 35 includes porous screening material that is surrounded by and mounted to a solid border 35a. As shown in FIGS. 3 and 8 for example, on the inner face of the border 35a there is are several detents 35b spaced symmetrically around the border 35a. As shown in FIG. 3 for example, the detents 35b are formed on the ends of tongues 35c that are resiliently deformable so that when the first screen 35 is placed in registry with the first opening 16a, the application of pressure against the border 35a suffices to spread apart the tongues 35c and allow the detents 35b to pass over the frame's edge that defines the first opening 16a. Once the detents 35b get past the edge that defines the first opening 16a in the frame 15, the tongues 35c resiliently spring back into the bias position such that the detents 35b lock the border 35a of the screen 35 against the inner surface 15b of the frame 15. The detents 35b have a tapered edge that faces the outer surface of the border 35a so that a lever can be used to pry the border 35a of the screen 35 away from the inner surface 15b of the frame 15. At the same time, the tapered surfaces of the detents 35b will slide past the edge that defines the first opening 16a.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A hingeless ventilator, comprising:
   a generally planar-shaped frame defining an inner surface and an outer surface disposed opposite said inner surface, said frame further defining a first opening therethrough and a second opening therethrough, said second opening being spaced apart from said first opening, said outer surface of said frame defining a seating rim configured to surround said first and second openings;
   a first upright sleeve being disposed between said openings and defining a first exterior track surface, said first upright sleeve being connected to said inner surface of said frame and extending in a direction generally perpendicular to said inner surface of said frame, said first upright sleeve including a first guide stop extending generally parallel to said inner surface of said frame;
   a second upright sleeve being disposed between said openings and defining a second exterior track surface, said second upright sleeve being connected to said inner surface of said frame and extending in a direction generally perpendicular to said inner surface of said frame, said second upright sleeve being spaced apart from said first upright sleeve, said second upright sleeve including a second guide stop extending generally parallel to said inner surface of said frame;
   a door having a main body disposed to face said outer surface of said frame and configured to be selectively positionable to cover and uncover both said first and second openings, said door defining a lip surrounding the periphery thereof and extending generally perpendicularly to said main body;
   a first door strut connected to said main body of said door and extending in a direction generally perpendicular to said main body of said door and extending through said first opening, said first door strut defining a first elongated cutout that elongates in a direction perpendicular to said main body of said door, said first door strut defining a first Y-shaped cutout having an open-topped Y-shaped peripheral outline, said first guide stop extending through said first Y-shaped cutout;
   a second door strut connected to said main body of said door and extending in a direction generally perpendicular to said main body of said door and extending through said second opening, the second door strut defining a second elongated cutout that elongates in a direction perpendicular to said main body of said door, said second door strut defining a second Y-shaped cutout having an open-topped Y-shaped peripheral outline, said second guide stop extending through said first Y-shaped cutout;
   a handle connected to said first door strut and to said second door strut, said handle being configured with a gripping surface for the hand of an operator to manipulate the movement of the handle, said handle defining a first side and a second side disposed opposite said first side, said handle defining a hollow inner chamber disposed between said first side and said second side, said first side defining an elongated first slot communicating with said inner chamber, said second side defining an elongated second slot communicating with said inner chamber, said first slot having a first upper end and a first lower end disposed opposite said first upper end, said second slot having a second upper end and a second lower end disposed opposite said second upper end;

an elongated axle having a first end and a second end disposed opposite said first end, said axle extending through said hollow inner chamber with said first end of said axle slideably disposed within said first elongated cutout of said first door strut and said second end of said axle being slideably disposed within said second elongated cutout of said second door strut;

at least a first spring disposed in said inner chamber so as to bias said axle toward said first and second lower ends of said respective first and second slots defined through said respective first and second sides of said main body of said handle;

a first roller rotatably mounted on said axle and disposed between said first end of said axle and said first side of said lower body of said handle and being biased by said spring into contacting said exterior track surface of said first upright sleeve;

a second roller rotatably mounted on said axle and disposed between said second end of said axle and said second side of said lower body of said handle and being biased by said spring into contacting said exterior track surface of said second upright sleeve; and said handle, said first and second door struts, and said door being movable relative to said frame and said first and second upright sleeves while limited by interaction between the axle and the first and second elongated cutouts and between the first and second guide stops and the first and second Y-shaped cutouts.

2. A hingeless ventilator as in claim 1, wherein said first upright sleeve being connected to said inner surface of said frame by a first upright extending from said inner surface of said frame in a direction generally perpendicular to said frame and disposed between said openings, said first upright sleeve being mounted over said first upright; and said second upright sleeve being connected to said inner surface of said frame by a second upright extending from said inner surface of said frame in a direction generally perpendicular to said frame and disposed between said openings, said second upright sleeve being mounted over said second upright.

3. A hingeless ventilator as in claim 1, wherein said first exterior track surface includes a first apex surface disposed between a first forward edge and a first rearward edge disposed opposite said first forward edge, said two edges of said first upright sleeve defining a shape that tapers toward said first apex surface, each of said first forward edge and said first rearward edge defining a plurality of indents.

4. A hingeless ventilator as in claim 3, wherein the spacing between the indents in the first forward edge differs from the spacing between the indents in the first rearward edge.

5. A hingeless ventilator, comprising:

a frame defining an inner surface extending generally in a first plane and an outer surface disposed opposite said inner surface and extending generally in a second plane, said frame further defining a first opening through said inner and outer surfaces of said frame and a second opening through said inner and outer surfaces of said frame, said second opening being spaced apart from said first opening, said outer surface of said frame defining a seating rim configured to surround said first and second openings and disposed generally in a third plane spaced apart from the second plane generally defining said outer surface of said frame, said seating rim defining at least one raised portion extending spaced apart a greater distance from the second plane generally defining said outer surface of said frame than the third plane where sections of said rim immediately contiguous said raised portion of said rim are disposed;

a first upright extending from said inner surface of said frame in a direction generally perpendicular to the first plane of said frame and disposed between said openings and closer to said first opening than to said second opening, the first upright defining a generally triangularly shaped, first upper portion that is defined by a first outer edge, the first upright defining a first lower skirt portion that extends most of the entire width of the first opening of the frame, the first lower skirt portion being disposed beneath the first upper portion and defining a first detent opening through the first lower skirt portion;

a second upright extending from said inner surface of said frame in a direction generally perpendicular to the first plane of said frame and disposed between said openings and closer to said second opening than to said first opening, said second upright being disposed spaced apart from and alongside said first upright, the second upright defining a generally triangularly shaped, second upper portion that is defined by a second outer edge, the second upright defining a second lower skirt portion that extends most of the entire width of the second opening of the frame, the second lower skirt portion being disposed beneath the second upper portion and defining a second detent opening through the second lower skirt portion;

a first upright sleeve defining an interior surface defining a hollow cavity that receives therein said first upright, said first upright sleeve defining a first exterior track surface that includes a first apex surface disposed between a first forward edge and a first rearward edge disposed opposite said first forward edge, said two edges defining a shape that tapers toward said first apex surface, each of said first forward edge and said first rearward edge defining a first lower indent disposed closer to said frame than to said first apex surface, each of said first forward edge and said first rearward edge defining a first middle indent disposed between said first lower indent and said first apex surface, the first upright sleeve defines a first upper section and a first base section that is disposed beneath and contiguous to the first upper section, the first base section of the first upright sleeve defines a first inner side and a first outer side opposite from the first inner side, the first outer side of the first base section of the first upright sleeve defines a first guide stop that extends in a direction that is normal to the first outer side of the first base section of the first upright sleeve, the first inner side of the first base section of the first upright sleeve defines a first detent that extends in a direction that is normal to the first inner side of the first base section of the first upright sleeve;

a second upright sleeve defining an interior surface defining a hollow cavity that receives therein said second upright, said second upright sleeve defining a second exterior track surface that includes a second apex surface disposed between a second forward edge and a second rearward edge disposed opposite said second forward edge, said two edges of said second upright sleeve defining a shape that tapers toward said second apex surface of said second upright sleeve, each of said second forward edge and said second rearward edge defining a second lower indent disposed closer to said frame than to said first apex surface, each of said second forward edge and said second rearward edge defining a second middle indent disposed between said second lower indent and said second apex surface, the second upright sleeve defines a second upper section and a second base section that is disposed beneath and contiguous to the second upper section, the second base section of the second upright sleeve defines a second inner side and a second outer side opposite from the second inner side, the second outer side of the second base section of the second upright sleeve defines a second guide stop that extends in a direction that is normal to the second outer side of the second base section of the second upright sleeve, the second inner side of the second base section of the second upright sleeve defines a second detent that extends in a direction that is normal to the second inner side of the second base section of the second upright sleeve;

a door having a generally planar inner surface disposed to face said outer surface of said frame and configured to be selectively positionable to cover and uncover both said first and second openings, said door defining a lip surrounding said generally planar inner surface of said door and extending generally perpendicularly to said generally planar inner surface of said door;

a first door strut connected to said inner surface of said door in a direction generally perpendicular to the plane of said inner surface of said door and extending through said first opening, said first door strut defining a first elongated cutout that elongates in a direction perpendicular to said plane of said inner surface of said door, said first door strut further defining a first larger cutout that is disposed between the first elongated cutout and the inner surface of said door, the first larger cutout defining a generally rectangular shaped portion disposed near the inner surface of said door, the first larger cutout defining a generally trapezoidal shaped portion adjoining said rectangular shaped portion and having the base disposed closer to said first elongated cutout than to said rectangular shaped portion and wherein the base angles of said generally trapezoidal shaped portion are radiused, the first guide stop of the first upright sleeve is disposed to extend through the first larger cutout of the first door strut and defines a guide surface that is configured with a shape resembling an isosceles triangle with a rounded apex that is configured to complement the shape of the radiused base angles of the generally trapezoidal shaped portion of the first larger cutout of the first door strut;

a second door strut connected to said inner surface of said door in a direction generally perpendicular to the plane of said inner surface of said door and extending through said second opening, said second door strut defining a second elongated cutout that elongates in a direction perpendicular to said plane of said inner surface of said door, said second door strut further defining a second larger cutout that is disposed between the second elongated cutout and the inner surface of said door, the second larger cutout defining a generally rectangular shaped portion disposed near the inner surface of said door, the second larger cutout defining a generally trapezoidal shaped portion adjoining said rectangular shaped portion and having the base disposed closer to said second elongated cutout than to said rectangular shaped portion and wherein the base angles of said generally trapezoidal shaped portion are radiused;

a handle defining an upper body and a lower body, the distance between said lower body and said frame being less than the distance between said upper body and said frame, said upper body being configured with a gripping surface for the hand of an operator to manipulate the movement of the handle, said upper body being connected to said first door strut and to said second door strut, said lower body defining a first side and a second side disposed opposite said first side, said lower body defining a hollow inner chamber disposed between said first side and said second side, said first side defining an elongated first slot communicating with said inner chamber, said first slot having a first upper end and a first lower end disposed opposite said first upper end and such that said upper body is disposed farther from said first lower end than from said first upper end, said second side defining an elongated second slot communicating with said inner chamber, said second slot having a second upper end and a second lower end disposed opposite said second upper end and such that said upper body is disposed farther from said second lower end than from said second upper end;

an elongated axle having a first end and a second end disposed opposite said first end, said axle being disposed to extend through said hollow inner chamber with said first end extending beyond said first side and said second end extending beyond said second side, said first end of said axle being slideably held in said first elongated cutout of said first door strut, said second end of said axle being slideably held in said second elongated cutout of said second door strut;

at least a first spring disposed in said inner chamber so as to bias said axle toward said first and second lower ends of said respective first and second slots defined through said respective first and second sides of said lower body of said handle;

a first roller rotatably mounted on said axle and disposed between said first end of said axle and said first side of said lower body of said handle and being biased by said spring into contacting said exterior track surface of said first upright sleeve; and a second roller rotatably mounted on said axle and disposed between said second end of said axle and said second side of said lower body of said handle and being biased by said spring into contacting said exterior track surface of said second upright sleeve.

6. A hingeless ventilator as in claim 5, wherein:

the first detent of the first upright sleeve is received within the first opening defined through the first lower skirt portion of the first upright so as to connect the first upright sleeve to the first upright.

* * * * *